US012600392B2

(12) United States Patent
Otsuki et al.

(10) Patent No.: US 12,600,392 B2
(45) Date of Patent: Apr. 14, 2026

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Tomoshi Otsuki, Kawasaki (JP); Hideki Kubo, Tokyo (JP); Shinichiro Ogawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 106 days.

(21) Appl. No.: 18/590,784

(22) Filed: Feb. 28, 2024

(65) Prior Publication Data

US 2025/0083718 A1 Mar. 13, 2025

(30) Foreign Application Priority Data

Sep. 12, 2023 (JP) ................................. 2023-147948

(51) Int. Cl.
*B61L 27/12* (2022.01)
*G06Q 10/047* (2023.01)
*G06Q 50/40* (2024.01)

(52) U.S. Cl.
CPC ............ *B61L 27/12* (2022.01); *G06Q 10/047* (2013.01); *G06Q 50/40* (2024.01)

(58) Field of Classification Search
CPC ....... B61L 27/12; B61L 27/16; G06Q 10/047; G06Q 50/40
See application file for complete search history.

(56) References Cited

FOREIGN PATENT DOCUMENTS

CN 112633831 A 4/2021
EP 3992057 A 5/2022
(Continued)

OTHER PUBLICATIONS

Autonomous Shuttle Bus Service Timetabling and Vehicle Scheduling Using Skip-Stop Tactic Transportation Research Part C p. 370-390 (Year: 2019).*

(Continued)

*Primary Examiner* — Long T Tran
*Assistant Examiner* — Charles J Brauch
(74) *Attorney, Agent, or Firm* — Knobbe, Martens, Olson & Bear, LLP

(57) ABSTRACT

An information processing comprising a processing circuitry which acquire, with respect to a first route including first stop positions in which one of the first stop positions is a first transfer position, first train line information including a stop time and a departure time at the first stop positions of a first moving vehicle, acquire route information of a second route that includes second stop positions, one of the second stop positions being a second transfer position that allows a transfer to or from the first transfer position, and acquire number-of-passengers information on a number of passengers transferring from the first transfer position to the second transfer position or vice versa; and create second train line information including a stop time and a departure time at the second stop positions of a second moving vehicle, based on the first train line information, the route information and the number-of-passengers information.

20 Claims, 24 Drawing Sheets

(56)        References Cited

FOREIGN PATENT DOCUMENTS

| EP | 3992057 A1 * | 5/2022 | ............. G06Q 10/04 |
| JP | 2015-140122 | 8/2015 | |

OTHER PUBLICATIONS

Cao et al., "Autonomous shuttle bus service timetabling and vehicle scheduling using skip-stop tactic", Transportation Research Part C, 2019, pp. 370-395.
Extended European Search Report issued in European Patent Application No. 24160721.7, dated Aug. 9, 2024 in 9 pages.

* cited by examiner

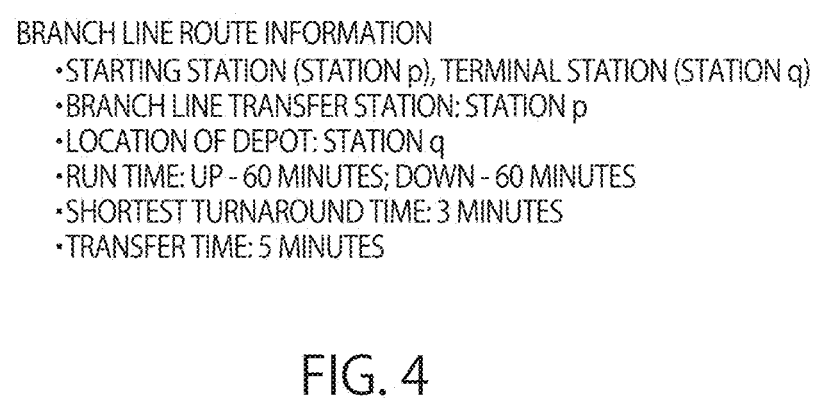

BRANCH LINE ROUTE INFORMATION
   •STARTING STATION (STATION p), TERMINAL STATION (STATION q)
   •BRANCH LINE TRANSFER STATION: STATION p
   •LOCATION OF DEPOT: STATION q
   •RUN TIME: UP - 60 MINUTES; DOWN - 60 MINUTES
   •SHORTEST TURNAROUND TIME: 3 MINUTES
   •TRANSFER TIME: 5 MINUTES

FIG. 4

MAIN LINE SCHEDULE

| UP TRAIN TIME | DOWN TRAIN TIME |
|---|---|
| 5:05 | 5:23 |
| 5:53 | 5:48 |
| 6:13 | 5:52 |
| 6:35 | 6:17 |
| 7:21 | 6:44 |
| 7:26 | 6:54 |
| . . . | . . . |
| 22:43 | 21:49 |
| 23:01 | |
| 23:14 | |

FIG. 5

NUMBER OF INCOMING/OUTGOING TRANSIT PASSENGER INFORMATION

| t | INCOMING UP PASSENGER | INCOMING DOWN PASSENGER | OUTGOING UP PASSENGER | OUTGOING DOWN PASSENGER |
|---|---|---|---|---|
| 5:00 | 30 | 30 | 30 | 30 |
| 5:30 | 30 | 30 | 30 | 30 |
| 6:00 | 60 | 30 | 30 | 30 |
| 6:30 | 60 | 30 | 30 | 30 |
| 7:00 | 60 | 30 | 30 | 30 |
| 7:30 | 60 | 30 | 30 | 30 |
| 8:00 | 60 | 30 | 30 | 30 |
| 8:30 | 30 | 30 | 30 | 30 |
| 9:00 | 30 | 30 | 30 | 30 |
| 9:30 | 30 | 30 | 30 | 30 |
| 10:00 | 30 | 30 | 30 | 30 |
| 10:30 | 30 | 30 | 30 | 30 |
| 11:00 | 30 | 30 | 30 | 30 |
| 11:30 | 30 | 30 | 30 | 30 |
| 12:00 | 30 | 30 | 30 | 30 |
| 12:30 | 30 | 30 | 30 | 30 |
| 13:00 | 30 | 30 | 30 | 30 |
| 13:30 | 30 | 30 | 30 | 30 |
| 14:00 | 30 | 30 | 30 | 30 |
| 14:30 | 30 | 30 | 30 | 30 |
| 15:00 | 30 | 30 | 30 | 30 |
| 15:30 | 30 | 30 | 30 | 30 |
| 16:00 | 30 | 30 | 30 | 30 |
| 16:30 | 30 | 30 | 30 | 30 |
| 17:00 | 30 | 30 | 30 | 30 |
| 17:30 | 30 | 30 | 30 | 30 |
| 18:00 | 30 | 30 | 30 | 60 |
| 18:30 | 30 | 30 | 30 | 60 |
| 19:00 | 30 | 30 | 30 | 60 |
| 19:30 | 30 | 30 | 30 | 60 |
| 20:00 | 30 | 30 | 30 | 60 |
| 20:30 | 30 | 30 | 30 | 30 |
| 21:00 | 30 | 30 | 30 | 30 |
| 21:30 | 30 | 0 | 30 | 0 |
| 22:00 | 0 | 0 | 0 | 0 |

FIG. 6

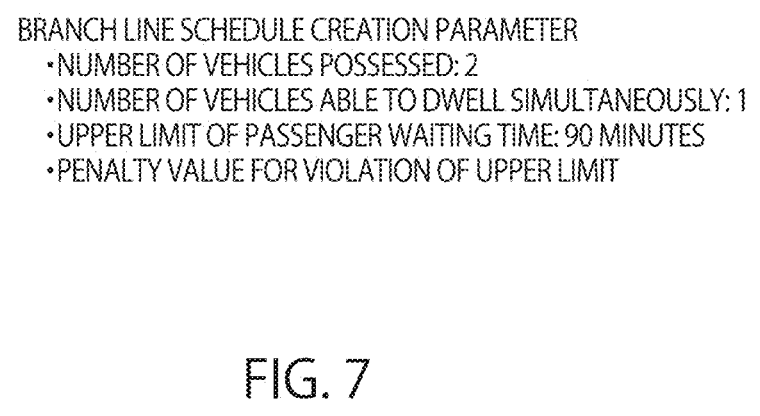

BRANCH LINE SCHEDULE CREATION PARAMETER
 · NUMBER OF VEHICLES POSSESSED: 2
 · NUMBER OF VEHICLES ABLE TO DWELL SIMULTANEOUSLY: 1
 · UPPER LIMIT OF PASSENGER WAITING TIME: 90 MINUTES
 · PENALTY VALUE FOR VIOLATION OF UPPER LIMIT

FIG. 7

OUTPUT DATA

BRANCH LINE UP SCHEDULE

| VEHICLE ID | DEPARTURE TIME | ARRIVAL TIME |
|---|---|---|
| A | 400 | 500 |
| B | 455 | 555 |
| A | 615 | 715 |
| B | 704 | 804 |
| | . . | |
| | . | . . . |

BRANCH LINE DOWN SCHEDULE

| VEHICLE ID | DEPARTURE TIME | ARRIVAL TIME |
|---|---|---|
| A | 510 | 610 |
| B | 558 | 658 |
| A | 724 | 824 |
| B | 810 | 910 |
| | | |
| | . . . | . . . |

FIG. 8

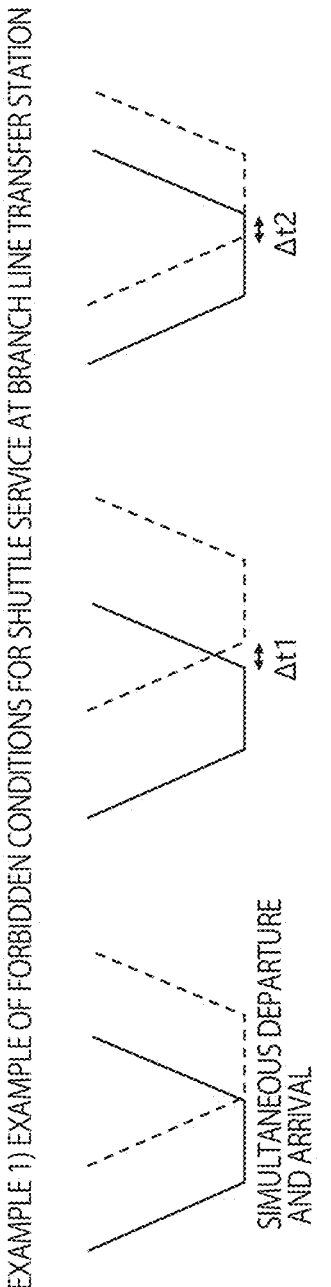
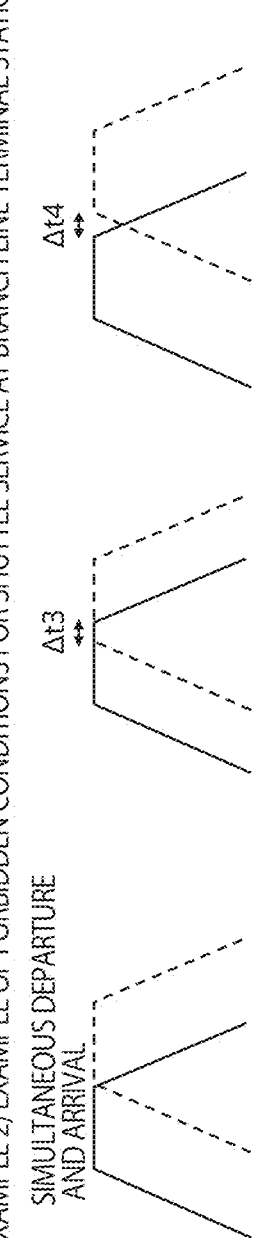
FIG. 17

BRANCH LINE CANDIDATE UP TRAIN LINE

| id | DEPARTURE TIME | ARRIVAL TIME | THE NUMBER OF INCOMING PASSENGERS |
|---|---|---|---|
| 0 | 400 | 500 | 5 |
| 1 | 407 | 507 | 0 |
| 2 | 418 | 518 | 23 |
| 3 | 425 | 525 | 0 |
| 4 | 443 | 543 | 25 |
| 5 | 447 | 547 | 4 |
| 6 | 448 | 548 | 48 |
| 7 | 450 | 550 | 0 |
| 8 | 454 | 554 | 0 |
| 9 | 455 | 555 | 0 |
| 10 | 508 | 608 | 267 |
| 11 | 512 | 612 | 25 |
| 12 | 515 | 615 | 0 |
| 13 | 519 | 619 | 0 |
| 14 | 530 | 630 | 440 |
| 15 | 537 | 637 | 0 |
| 16 | 539 | 639 | 27 |
| 17 | 546 | 646 | 0 |
| 18 | 549 | 649 | 10 |
| 19 | 556 | 656 | 0 |
| 20 | 615 | 715 | 900 |
| 21 | 618 | 718 | 60 |
| 22 | 621 | 721 | 32 |
| 23 | 622 | 722 | 0 |
| 24 | 625 | 725 | 0 |
| 25 | 628 | 728 | 0 |
| 26 | 644 | 744 | 520 |
| 27 | 651 | 751 | 0 |
| 28 | 704 | 804 | 43 |
| 29 | 705 | 805 | 420 |

BRANCH LINE CANDIDATE DOWN TRAIN LINE

| id | DEPARTURE TIME | ARRIVAL TIME | THE NUMBER OF OUTGOING PASSENGERS |
|---|---|---|---|
| 0 | 503 | 603 | 0 |
| 1 | 510 | 610 | 5 |
| 2 | 521 | 621 | 0 |
| 3 | 528 | 628 | 23 |
| 4 | 546 | 646 | 0 |
| 5 | 550 | 650 | 0 |
| 6 | 551 | 651 | 0 |
| 7 | 553 | 653 | 25 |
| 8 | 557 | 657 | 4 |
| 9 | 558 | 658 | 48 |
| 10 | 611 | 711 | 0 |
| 11 | 615 | 715 | 0 |
| 12 | 618 | 718 | 20 |
| 13 | 622 | 722 | 25 |
| 14 | 633 | 733 | 0 |
| 15 | 640 | 740 | 22 |
| 16 | 642 | 742 | 0 |
| 17 | 649 | 749 | 27 |
| 18 | 652 | 752 | 0 |
| 19 | 659 | 759 | 10 |
| 20 | 718 | 818 | 0 |
| 21 | 721 | 821 | 0 |
| 22 | 724 | 824 | 0 |
| 23 | 725 | 825 | 45 |
| 24 | 728 | 828 | 3 |
| 25 | 731 | 831 | 32 |
| 26 | 747 | 847 | 0 |
| 27 | 754 | 854 | 26 |
| 28 | 807 | 907 | 0 |
| 29 | 808 | 908 | 0 |

FIG. 19

BRANCH LINE UP SCHEDULE

| id | ADOPTED CANDIDATE TRAIN LINE 2 | DEPARTURE TIME | ARRIVAL TIME | THE NUMBER OF INCOMING PASSENGERS | CONNECTION | WAITING TIME (MINUTES) 2 |
|---|---|---|---|---|---|---|
| 0 | * | 400 | 500 | 5 | u | 0 |
| 1 |  | 407 | 507 | 0 | . |  |
| 2 |  | 418 | 518 | 23 | d | 18 |
| 3 |  | 425 | 525 | 0 | . |  |
| 4 |  | 443 | 543 | 25 | d | 43 |
| 5 |  | 447 | 547 | 4 | d | 47 |
| 6 |  | 448 | 548 | 48 | u | 48 |
| 7 |  | 450 | 550 | 0 | . |  |
| 8 |  | 454 | 554 | 0 | . |  |
| 9 | * | 455 | 555 | 0 | . |  |
| 10 |  | 508 | 608 | 267 | u | 13 |
| 11 |  | 512 | 612 | 25 | d | 17 |
| 12 |  | 515 | 615 | 0 | . |  |
| 13 |  | 519 | 619 | 0 | . |  |
| 14 |  | 530 | 630 | 440 | u | 35 |
| 15 |  | 537 | 637 | 0 | . |  |
| 16 |  | 539 | 639 | 27 | d | 44 |
| 17 |  | 546 | 646 | 0 | . |  |
| 18 |  | 549 | 649 | 10 | d | 54 |
| 19 |  | 556 | 656 | 0 | . |  |
| 20 | * | 615 | 715 | 900 | u | 0 |
| 21 |  | 618 | 718 | 60 | u | 3 |
| 22 |  | 621 | 721 | 32 | d | 6 |
| 23 |  | 622 | 722 | 0 | . |  |
| 24 |  | 625 | 725 | 0 | . |  |
| 25 |  | 628 | 728 | 0 | . |  |
| 26 |  | 644 | 744 | 520 | u | 29 |
| 27 |  | 651 | 751 | 0 | . |  |
| 28 | * | 704 | 804 | 43 | d | 0 |
| 29 |  | 705 | 805 | 420 | u | 1 |

BRANCH LINE DOWN SCHEDULE

| id | ADOPTED CANDIDATE TRAIN LINE 2 | DEPARTURE TIME | ARRIVAL TIME | THE NUMBER OF OUTGOING PASSENGERS | CONNECTION | WAITING TIME (MINUTES) 2 |
|---|---|---|---|---|---|---|
| 0 |  | 503 | 603 | 0 | . |  |
| 1 | * | 510 | 610 | 5 | u | 0 |
| 2 |  | 521 | 621 | 0 | . |  |
| 3 |  | 528 | 628 | 23 | d | 30 |
| 4 |  | 546 | 646 | 0 | . |  |
| 5 |  | 550 | 650 | 0 | . |  |
| 6 |  | 551 | 651 | 0 | . |  |
| 7 |  | 553 | 653 | 25 | d | 5 |
| 8 |  | 557 | 657 | 4 | d | 1 |
| 9 | * | 558 | 658 | 48 | u | 0 |
| 10 |  | 611 | 711 | 0 | . |  |
| 11 |  | 615 | 715 | 0 | . |  |
| 12 |  | 618 | 718 | 20 | u | 67 |
| 13 |  | 622 | 722 | 25 | d | 63 |
| 14 |  | 633 | 733 | 0 | . |  |
| 15 |  | 640 | 740 | 22 | u | 45 |
| 16 |  | 642 | 742 | 0 | . |  |
| 17 |  | 649 | 749 | 27 | d | 36 |
| 18 |  | 652 | 752 | 0 | . |  |
| 19 |  | 659 | 759 | 10 | d | 26 |
| 20 |  | 718 | 818 | 0 | . |  |
| 21 |  | 721 | 821 | 0 | . |  |
| 22 |  | 724 | 824 | 0 | . |  |
| 23 | * | 725 | 825 | 45 | u | 0 |
| 24 |  | 728 | 828 | 3 | u | 57 |
| 25 |  | 731 | 831 | 32 | d | 54 |
| 26 |  | 747 | 847 | 0 | . |  |
| 27 |  | 754 | 854 | 26 | u | 31 |
| 28 |  | 807 | 907 | 0 | . |  |
| 29 |  | 808 | 908 | 0 | . |  |

FIG. 20

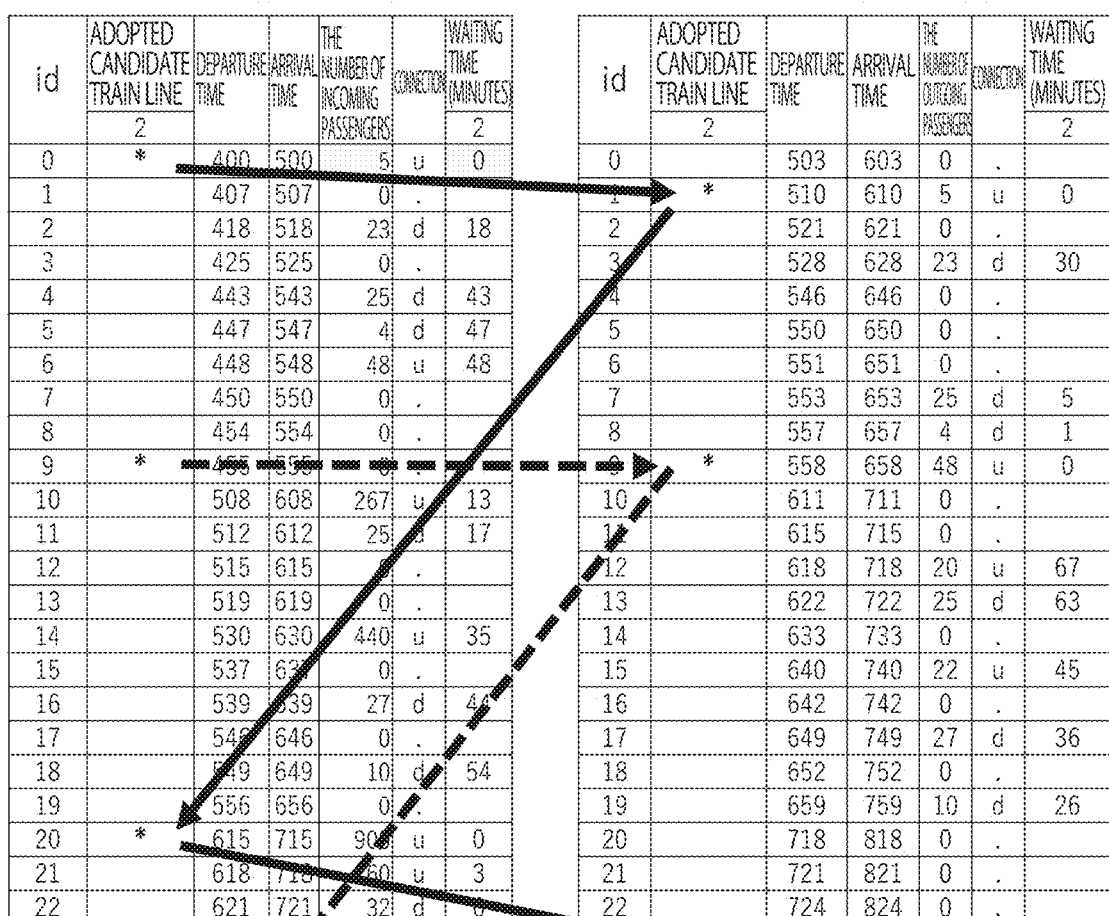

BRANCH LINE UP SCHEDULE

| id | ADOPTED CANDIDATE TRAIN LINE | DEPARTURE TIME | ARRIVAL TIME | THE NUMBER OF INCOMING PASSENGERS | CONNECTION | WAITING TIME (MINUTES) |
|---|---|---|---|---|---|---|
| | 2 | | | | | 2 |
| 0 | * | 400 | 500 | 5 | u | 0 |
| 1 | | 407 | 507 | 0 | . | |
| 2 | | 418 | 518 | 23 | d | 18 |
| 3 | | 425 | 525 | 0 | . | |
| 4 | | 443 | 543 | 25 | d | 43 |
| 5 | | 447 | 547 | 4 | d | 47 |
| 6 | | 448 | 548 | 48 | u | 48 |
| 7 | | 450 | 550 | 0 | . | |
| 8 | | 454 | 554 | 0 | . | |
| 9 | * | 4__ | 5__ | 0 | . | |
| 10 | | 508 | 608 | 267 | u | 13 |
| 11 | | 512 | 612 | 25 | | 17 |
| 12 | | 515 | 615 | 0 | . | |
| 13 | | 519 | 619 | 0 | . | |
| 14 | | 530 | 630 | 440 | u | 35 |
| 15 | | 537 | 63_ | 0 | . | |
| 16 | | 539 | 639 | 27 | d | 4_ |
| 17 | | 54_ | 646 | 0 | . | |
| 18 | | _9 | 649 | 10 | d | 54 |
| 19 | | 556 | 656 | 0 | . | |
| 20 | * | 615 | 715 | 90 | u | 0 |
| 21 | | 618 | 7_0 | _0 | u | 3 |
| 22 | | 621 | 721 | 32 | d | |
| 23 | | 622 | 72_ | 0 | . | |
| 24 | | 625 | _25 | 0 | . | |
| 25 | | 62_ | 728 | 0 | . | |
| 26 | | _4 | 744 | 520 | u | 29 |
| 27 | | 651 | 751 | 0 | . | |
| 28 | * | 704 | 804 | 43 | d | 0 |
| 29 | | 705 | 805 | 420 | u | 1 |

BRANCH LINE DOWN SCHEDULE

| id | ADOPTED CANDIDATE TRAIN LINE | DEPARTURE TIME | ARRIVAL TIME | THE NUMBER OF OUTGOING PASSENGERS | CONNECTION | WAITING TIME (MINUTES) |
|---|---|---|---|---|---|---|
| | 2 | | | | | 2 |
| 0 | | 503 | 603 | 0 | . | |
| 1 | * | 510 | 610 | 5 | u | 0 |
| 2 | | 521 | 621 | 0 | . | |
| 3 | | 528 | 628 | 23 | d | 30 |
| 4 | | 546 | 646 | 0 | . | |
| 5 | | 550 | 650 | 0 | . | |
| 6 | | 551 | 651 | 0 | . | |
| 7 | | 553 | 653 | 25 | d | 5 |
| 8 | | 557 | 657 | 4 | d | 1 |
| 9 | * | 558 | 658 | 48 | u | 0 |
| 10 | | 611 | 711 | 0 | . | |
| 11 | | 615 | 715 | 0 | . | |
| 12 | | 618 | 718 | 20 | u | 67 |
| 13 | | 622 | 722 | 25 | d | 63 |
| 14 | | 633 | 733 | 0 | . | |
| 15 | | 640 | 740 | 22 | u | 45 |
| 16 | | 642 | 742 | 0 | . | |
| 17 | | 649 | 749 | 27 | d | 36 |
| 18 | | 652 | 752 | 0 | . | |
| 19 | | 659 | 759 | 10 | d | 26 |
| 20 | | 718 | 818 | 0 | . | |
| 21 | | 721 | 821 | 0 | . | |
| 22 | | 724 | 824 | 0 | . | |
| 23 | * | 725 | 825 | 45 | u | 0 |
| 24 | | 728 | 828 | 3 | u | 57 |
| 25 | | 731 | 831 | 32 | d | 54 |
| 26 | | 747 | 847 | 0 | . | |
| 27 | | 754 | 854 | 26 | u | 31 |
| 28 | | 807 | 907 | 0 | . | |
| 29 | | 808 | 908 | 0 | . | |

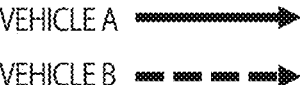

VEHICLE A ⟶
VEHICLE B ⇢

FIG. 21

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2023-147948, filed on Sep. 12, 2023, the entire contents of which are incorporated herein by reference.

FIELD

The present embodiment relates to an information processing apparatus, an information processing method, and a non-transitory computer readable medium.

BACKGROUND

In recent years sustainability of local area mobility realized by private vehicles in Japan and developed countries has become a problem, and development including efficient use of MaaS (Mobility as a Service) and CASE intended to improve convenience of public transport has become active. CASE is a coined word, which stands for Connected, Autonomous, Shared & Service, and Electric. When public transport is used by making connections, it can be expected that convenience of local public mobility network is improved by working out an operation plan that will minimize the times required to reach destinations.

In aging and depopulating local cities, demand for public transport is expected to increase, while on the other hand it is considered that in low-population areas, transportation efficiency of public transport will decrease greatly due to decreasing population. In a situation in which aging and population reduction progress simultaneously, public transport used less frequently is expected to become increasingly difficult to maintain.

A technique for simultaneously drawing up operation schedules (schedules) for a plurality of routes running alongside is known. The technique simultaneously draws up railroad schedules for a plurality of routes running alongside under given conditions of operation intervals. However, no method for drawing up schedules by taking transfers among multiple routes into consideration has been disclosed.

BRIEF DESCRIPTION OF THE DRAWINGS

FIG. 4 is a diagram showing an example of branch line route information;

FIG. 5 is a diagram showing a train timetable as an example of a main line schedule;

FIG. 6 is a diagram showing an example of number-of-incoming/outgoing-transit-passengers information;

FIG. 7 is a diagram showing an example of branch line schedule creation parameters;

FIG. 8 is a diagram showing an example of output data of the present apparatus;

FIG. 17 is a diagram showing examples of constraint conditions forbidding an inappropriate shuttle service;

FIG. 19 is a diagram showing an example of candidate up and down train lines created in the process of Step 1;

FIG. 20 is a diagram showing an example of branch line schedules created by solving an optimization problem;

FIG. 21 is a diagram showing an example of train lines along which respective vehicles run, where the train lines are connected in order by arrowed lines;

DETAILED DESCRIPTION

According to one embodiment, an information processing apparatus comprising a processing circuitry configured to acquire, with respect to a first route including a plurality of first stop positions in which one of the first stop positions is a first transfer position, one or more pieces of first train line information each including at least one of a stop time and a departure time at the first stop positions of at least one first moving vehicle;

acquire route information of a second route that includes a plurality of second stop positions, one of the second stop positions being a second transfer position that allows a transfer to or from the first transfer position;

acquire number-of-passengers information on a number of passengers who transfer from the first transfer position to the second transfer position or from the second transfer position to the first transfer position; and create one or more pieces of second train line information including a stop time and a departure time at the second stop positions of at least one of second moving vehicle, based on the one or more pieces of first train line information, the route information and the number-of-passengers information.

Embodiments of the present invention will be described below with reference to the drawings.

First Embodiment

Outline of Present Embodiment

First, the present embodiment will be outlined.

Figure 1:
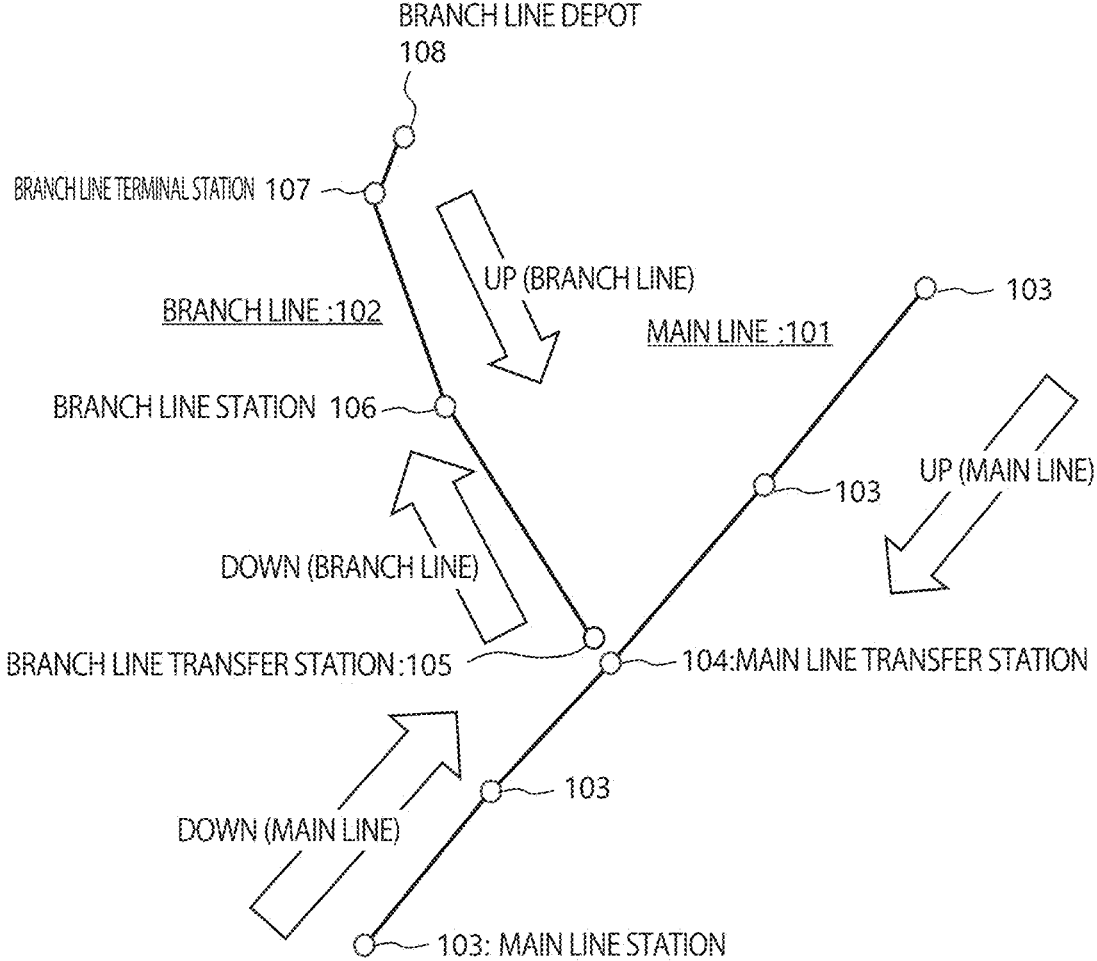
FIG. 1 is a diagram showing a relationship between a main line route and a branch line route.

FIG. 1 is a diagram showing a relationship between a main line route 101 (also referred to as a main line) and a branch line route 102 (also referred to as a branch line). It is assumed here that the main line 101 is a railroad and the branch line 102 is a vehicle (hereinafter referred to as a vehicle) such as a bus. However, the main line and the branch line are not limited to a railroad and a bus and may be any moving vehicles. For example, both the main and branch lines may be railroads or busses or one or both of the main and branch lines may be a means of transport such as an airplane, a ship, a taxi, a streetcar, a monorail system, new transport system, a cable car, or a ropeway.

The main line 101 corresponds to a first route including a plurality of main line stations 103 as a plurality of first stop positions where trains stop. One of the plurality of main line stations 103 is a main line transfer station 104 serving as a first transfer position. The branch line 102 corresponds to a second route including a plurality of branch line stations 106 (second stop positions) as a plurality of second stop positions where vehicles stop. One of the plurality of branch line stations 106 is a branch line transfer station 105 serving as a second transfer position.

Transfers from the main line 101 to the branch line 102, or from the branch line 102 to the main line 101 can be carried out via the main line transfer station 104 or the branch line transfer station 105. That is, transfers can be made from the main line transfer station 104 of the main line 101 to the branch line transfer station 105 of the branch line 102, or from the branch line transfer station 105 to the main line transfer station 104. The main line 101 and the branch line 102 have respective up and down lines. A transfer means changing from a moving vehicle on one route to a moving vehicle on another route. The operators of these routes may be either the same or different.

It is assumed that the branch line transfer station 105 is located at one end point (referred to as a starting point) of the branch line 102 and a branch line terminal station 107 is located at the other end point (referred to as a terminus) on the side opposite the branch line transfer station 105. Regarding the branch line 102, the direction toward the branch line transfer station 105 will be referred to as an up direction and the opposite direction will be referred to as a down direction. The up direction of the branch line 102 corresponds to one of a first direction and a second direction, which is a direction opposite the first direction, and the down direction of the branch line 102 corresponds to the other of the first direction and the second direction.

Regarding the main line 101, the downward direction in FIG. 1 will be referred to as an up direction, and the opposite direction will be referred to as a down direction. The up direction of the main line 101 corresponds to one of a third direction and a fourth direction, which is a direction opposite the third direction, and the down direction of the main line 101 corresponds to the other of the third direction and the fourth direction.

Note that a depot 108 is provided at the branch line transfer station 105 of the branch line 102, and it is assumed that vehicles are put into the depot during time slots in which the vehicles are out of service.

It is assumed here that an operation schedule of the main line 101 (main line schedule) is given and arrival times (stop times) and departure times of up and down main lines 101 for the entire day at the main line transfer station 104 are all known. That is, the operation schedule of the main line 101 includes one or more pieces of train line information (first train line information) as up and down train line information for the entire day. Each of the multiple pieces of train line information includes a plurality of main line stations in which the train (first moving vehicle) dwells and at least one of the stop time and the departure time at each main line station (only the departure time is included in the case of a starting station and only the arrival time is included in the case of a terminal station). Note that in the case of an express or a special express, there can be main line stations 103 which the train passes without stopping. In that case, the nonstop main line stations 103 may be omitted from the train line information or passage times of trains passing through the main line stations 103 may be included.

In the present embodiment, a branch line schedule having good connectivity with the main line schedule (having good transfer efficiency) is created. For example, when the number of vehicles on the branch line 102 is known, a branch line schedule is created such that waiting time for passengers will be reduced during transfers from the main line 101 to the branch line 102 and from the branch line 102 to the main line 101. The branch line schedule created is an operation schedule including one or more pieces of train line information (second train line information) on the branch line 102, and each piece of the train line information includes a branch line station (second stop positions) at which the train stops on the branch line 102 and at least one of stop time and departure time. Note that in the case of an express or a special express, there can be branch line stations which the train passes without stopping. In that case, the nonstop branch line stations may be omitted from the train line information and passage times at the branch line stations may be included. The branch line schedule takes into consideration transfers to/from the main line and may be referred to as a transfer schedule.

(Outline of Branch Line Schedule)

Figure 2:
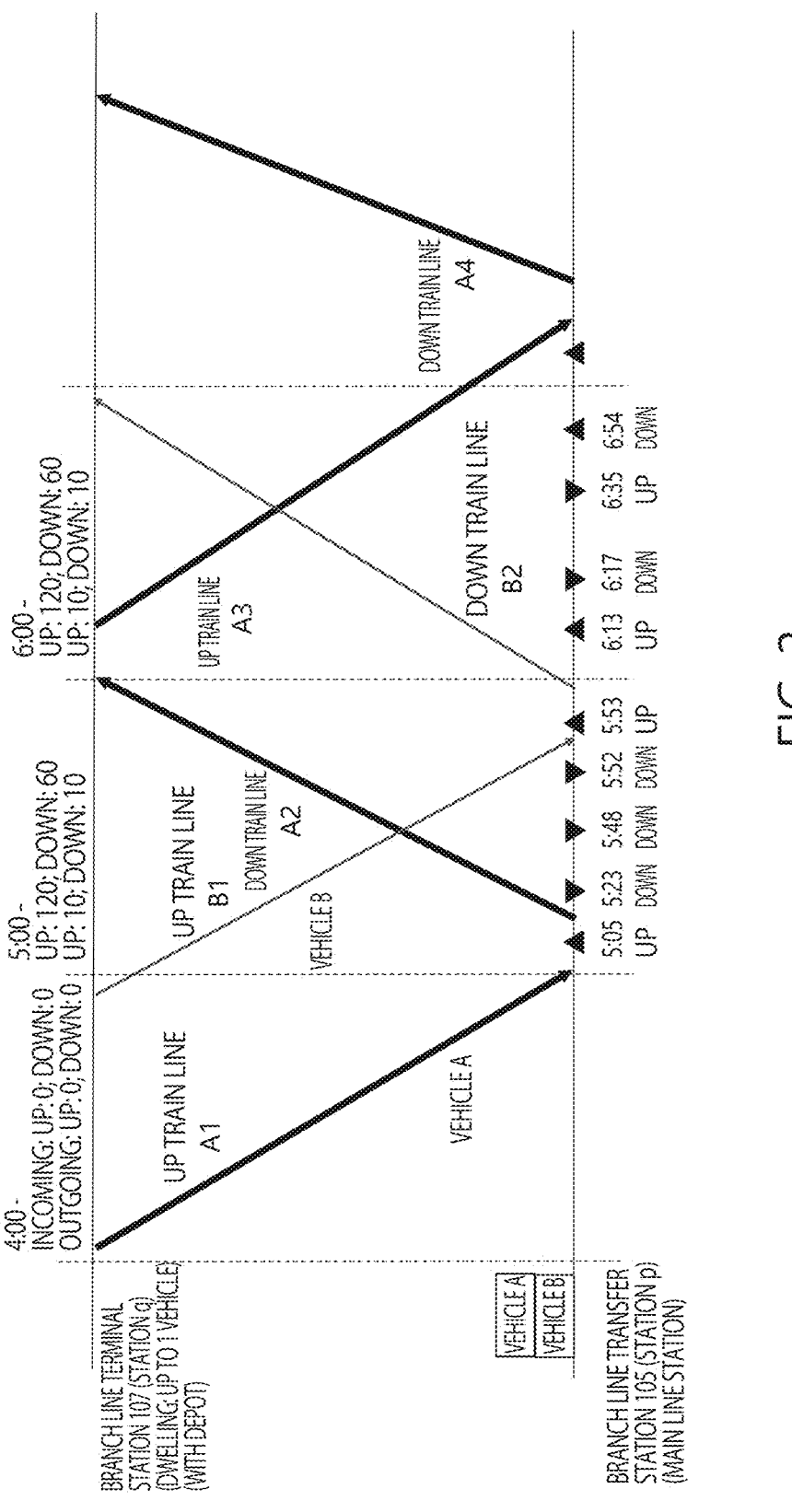
FIG. 2 is a diagram showing a train schedule in which the lower line represents a branch line transfer station, the upper line represents a branch line terminal station, and the abscissa represents a time axis.

Next, the branch line schedule created in the present embodiment will be outlined using FIG. 2. FIG. 2 shows a train schedule in which the lower line represents a branch line transfer station 105, the upper line represents a branch line terminal station 107, and the abscissa represents a time axis. The station name of the branch line transfer station 105 is p and the station name of the branch line terminal station 107 is q.

A schedule creation apparatus which is an information processing apparatus according to the present embodiment accepts as input branch line route information (see FIG. 4 described later), main line schedules (see FIG. 5 described later), number-of-incoming/outgoing-transit-passengers information (see FIG. 6 described later), and other parameters (see FIG. 7 described later). Concrete examples of each piece of information will be described later, and each piece of the information will be outlined now.

As described above, a main line schedule defines the departure and arrival times of trains at each up and down main line station 103. At the bottom of FIG. 2, an example of departure and arrival times at the branch line transfer station 105 on the main line schedule is shown along the time axis. For example, "5:05 IN" means that an up train along the main line 101 arrives at 5:00 and leaves at the same time. "5:23 OUT" means that a down train along the main line 101 arrives at 5:23 and leaves at the same time. The times such as "5:05 IN" and "5:23 OUT" belong to different pieces of train line information. The present embodiment handles cases in which arrival time and departure time are identical for the sake of simplicity, and this can easily be extended to cases in which arrival time and departure time are different.

Branch line route information is route information about the branch line 102, and defines, for example, run time between the branch line transfer station 105 and the branch line terminal station 107, the shortest time between when a train arrives at the branch line terminal station 107 or the branch line transfer station 105 and when the train leaves again (shortest turnaround time), the time required for passengers to transfer from the branch line 102 to the main line 101 or vice versa (layover), and the like. For example, when the passengers transfer from the branch line 102 to the main line 101, the layover includes the time required to move to the platform of the main line transfer station 104 on the main line 101 after getting off the vehicle at the branch line transfer station 105 of the branch line 102 at the arrival time. The time until the actual departure time of the train after a lapse of the layover from the arrival time at the branch line transfer station 105 corresponds to waiting time for the passengers.

The number-of-incoming/outgoing-transit-passengers information is information about at least one or both of: the number of passengers transferring from the main line transfer station 104 to the branch line transfer station 105 and the number of passengers transferring from the branch line transfer station 105 to the main line transfer station 104. According to the present embodiment, information about the number of incoming/outgoing transit passengers includes the numbers of incoming/outgoing transit passengers on the up and down main lines by classifying the numbers according to time. An example of the numbers of incoming/outgoing transit passengers is shown along the time axis at the top of FIG. 2. For example, between 6:00 and 7:00, on the up main line train, the number of incoming transit passengers (the number of incoming passengers transferring from the branch line 102 to the up main line train) and the number of outgoing transit passengers (the number of outgoing passengers transferring from the up main line train to the branch line 102) are 120 and 10, respectively, while on the down main line train, the number of incoming transit passengers (the number of incoming passengers transferring from the branch line 102 to the down main line train) and the number of outgoing transit passengers (the number of outgoing passengers transferring from the down main line train to the branch line 102) are 60 and 10, respectively.

The parameters include the number of vehicles possessed by the branch line 102 and the number of vehicles able to dwell simultaneously. In the example of FIG. 2, the number of possessed vehicles is two: vehicle A and vehicle B. The number of vehicles able to dwell simultaneously represents the maximum number of vehicles that can simultaneously dwell at the branch line terminal station 107, and is 1 in the present example. According to the present embodiment, the number of vehicles able to dwell simultaneously is defined only for the branch line terminal station 107, but may be defined for the branch line transfer station 105 as well.

When the various types of information described above are inputted, the present apparatus creates a branch line schedule expressed by train lines A1 to A4 indicated by thick lines and train lines B1 and B2 indicated by thin lines in FIG. 2. The train line is a straight line that expresses a movement of an up or down vehicle on a branch line schedule. Details of train lines are indicated by train line information. The train lines A1 to A4 represent the movements of the vehicle A and the train lines B1 and B2 represent the movements of the vehicle B. The branch line schedule includes information that defines the departure times and arrival times (departure and arrival times) of the up train lines and down train lines. In the branch line schedule, for the sake of simplicity, the movement of the vehicle corresponding to each train line is expressed by a single straight line without a dwell time on the way (at the branch line station 106). In this case, in creating the branch line schedule, it is sufficient to determine the departure and arrival times at the stations at opposite ends of the train line. Note that when it is desired to create a detailed schedule including the departure and arrival times at way stations, first the start time and end time of each train line can be determined based on the run time from the start point to the terminus, and subsequently the arrival and departure times at way stations can be determined as required. Note that according to the present embodiment, a vehicle such as a bus is assigned to each train line on the branch line schedule as described above, what is assigned may be another means of transport such as a ship or an aircraft without being limited to a bus or the like.

Train lines such as A2 and B2 directed from lower left to upper right are down train lines (train lines directed from the branch line transfer station 105 to the branch line terminal station 107) and train lines such as A1 and B1 directed from upper left to lower right are up train lines (train lines directed from the branch line terminal station 107 to the branch line transfer station 105). The branch line terminal station 107 has the depot 108 (see FIG. 1) and all the vehicles on the branch line 102 are put in the depot 108 in the nighttime and the like when the vehicles are out of service. Therefore, the first train lines of the vehicle A and vehicle B in the morning have to be up train lines (train lines departing from the branch line terminal station 107). The last train lines at night have to be down train lines (train lines arriving at the branch line terminal station 107).

Whereas an example in which the depot 108 is provided in the branch line terminal station 107 has been shown, the depot 108 may be provided in the branch line transfer station 105 or a way station 106. Alternatively, a plurality of depots 108 may be provided. Besides, there may be two transfer stations. In either case, the present embodiment can be expanded easily.

Now, let us pay attention to movements of a specific vehicle. For example, attention will be focused on the movements (train lines A1 to A4) of the vehicle A. Respective run times on the train lines A1, A2, A3, and A4 are given by the branch line route information, and are assumed to be 60 minutes in the present example. Note that up and down run times can be either equal or different, but in the present example, it is assumed that the run times are equal. The interval between when a vehicle arrives at the branch line terminal station 107 on the down train line A2 and when the vehicle leaves on the up train line A3 (turnaround time) is equal to or longer than the shortest turnaround time (e.g., 3 minutes). That is, the vehicle has to dwell for the shortest turnaround time or longer. The shortest turnaround time is defined by the branch line route information described above. Note that the shortest turnaround time can be either equal or different between the branch line terminal station 107 and the branch line transfer station 105, but in the present example, it is assumed that the shortest turnaround times are equal.

Some of passengers (branch line users) getting off the up train line of the branch line 102 at the branch line transfer station 105 make transfers (connections) to get on the up or down main line 101 at the main line transfer station 104. The number of passengers transferring from the branch line 102 to the up main line 101 will be referred to as the number of up passengers, and the number of passengers transferring from the branch line 102 to the down main line 101 will be referred to as the number of down passengers.

On the other hand, some of passengers (main line users) getting off the up or down main line 101 at the main line transfer station 104 transfer to the down train line of the branch line 102 at the branch line transfer station 105. The number of passengers transferring from the up or down main line 101 to the branch line 102 will be referred to as the number of outgoing up or down passengers. Note that transfer time required by transit passengers for a transfer (e.g., including a run between stations) between the branch line 102 and the main line 101 is given by the branch line route information. The transfer time for a transfer from the branch line 102 to the main line 101 and the transfer time for a transfer from the main line 101 to the branch line 102 may be either equal or different, but in the present example, it is assumed that the transfer times are equal.

Thus, the present embodiment proposes a technique for creating a branch line schedule based on the numbers of incoming/outgoing transit passengers transferring between routes in each time slot, branch line route information (such as station information, run time, the shortest turnaround time), and information available on the branch line such as information about the number of required vehicles when a main line schedule is given. As evaluation items for that, waiting time for incoming/outgoing passengers and the like are used. The present embodiment can create a practical branch line schedule while meeting various restrictions.

The schedule creation apparatus according to the present embodiment that creates a branch line schedule such as described above will be described in detail below.

[Basic Configuration of Schedule Creation Apparatus 10]

Figure 3:
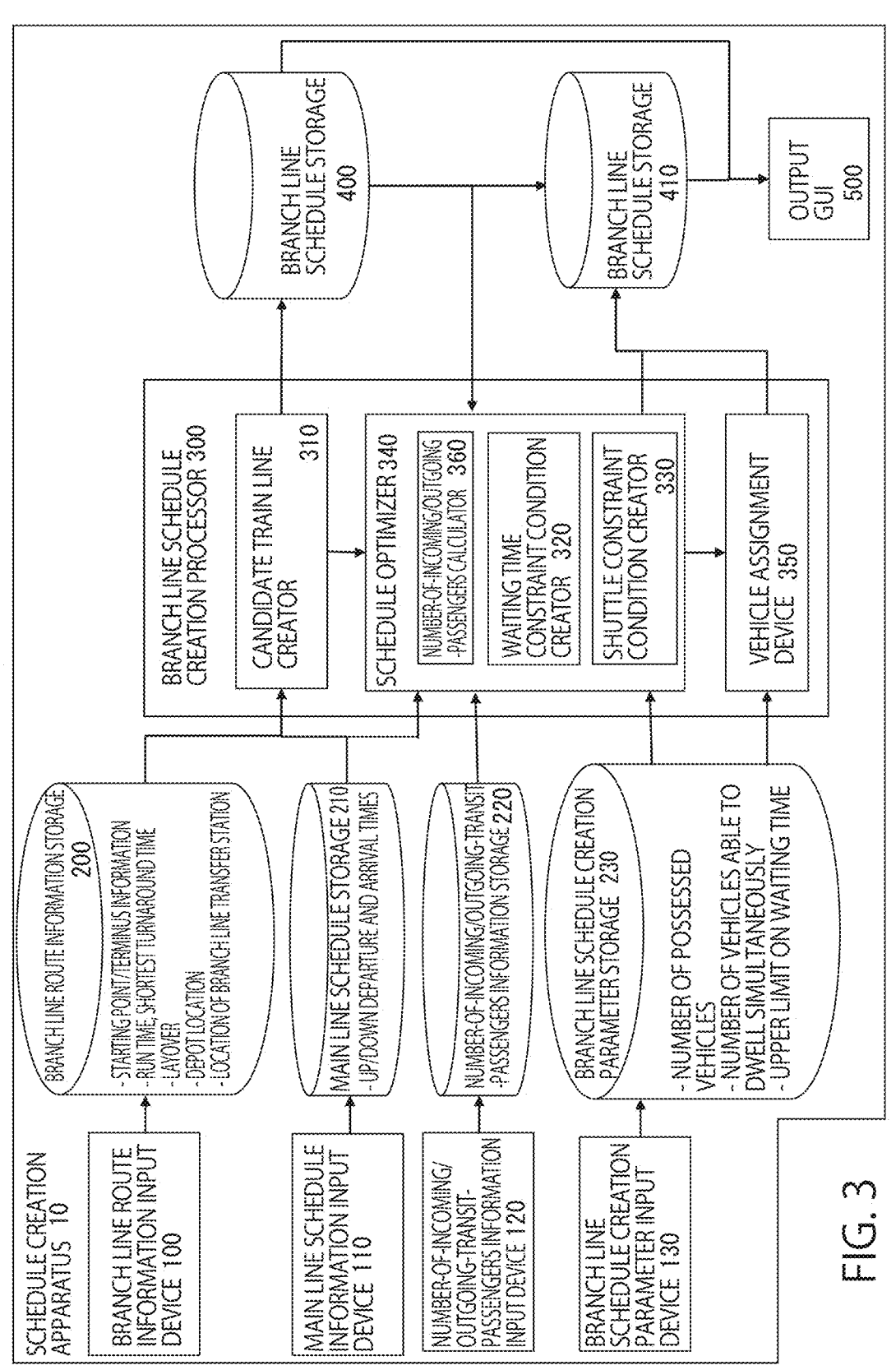
FIG. 3 is a diagram showing a configuration of a schedule creation apparatus according to a first embodiment.

FIG. 3 is a diagram showing a configuration of the schedule creation apparatus 10 according to the present embodiment.

The schedule creation apparatus 10 includes a branch line route information input device 100, a main line schedule information input device 110, a number-of-incoming/outgoing-transit-passengers information input device 120, a branch line schedule creation parameter input device 130, a branch line route information storage 200, a main line schedule storage 210, a number-of-incoming/outgoing-transit-passengers storage 220, a branch line schedule creation parameter storage 230, a branch line schedule creation processor 300, and an output GUI 500. The branch line schedule creation processor 300 corresponds to a processor or a processing circuitry configured to perform processes according to the present embodiment, and includes a candidate train line creator 310, a schedule optimizer 340, and a vehicle assignment device 350. The schedule optimizer 340 includes a number-of-incoming/outgoing-passengers calculator 360, a waiting time constraint condition creator 320, and a shuttle constraint condition creator 330.

These input devices 100 to 130 input various types of input data needed for processes of the present apparatus into the present apparatus.

The branch line route information input device 100 acquires branch line route information from an external device and stores the acquired information in the branch line route information storage 200. The stored branch line route information may be denoted as the branch line route information 200 using the same reference sign as the branch line route information storage 200. Examples of the external device include an operation device of the user, a storage device such as a memory, and a server. Examples of the operation device include a mouse, a keyboard, a touch panel, a voice input device, and a gesture input device (the same applies hereinafter).

The main line schedule information input device 110 acquires a main line schedule from an external device and stores the acquired main line schedule in the main line schedule storage 210. The stored main line schedule may be denoted as the main line schedule 210 using the same reference sign as the main line schedule storage 210.

The number-of-incoming/outgoing-transit-passengers information input device 120 acquires number-of-incoming/outgoing-transit-passengers information from an external device and stores the acquired information in the number-of-incoming/outgoing-transit-passengers storage 220. The stored number-of-incoming/outgoing-transit-passengers information may be denoted as the number-of-incoming/outgoing-transit-passengers information 220 using the same reference sign as the number-of-incoming/outgoing-transit-passengers storage 220.

The branch line schedule creation parameter input device 130 acquires branch line schedule creation parameters from an external device and stores the acquired parameters in the branch line schedule creation parameter storage 230. The stored branch line schedule creation parameters will be denoted as the branch line schedule creation parameters 230 using the same reference sign as the branch line schedule creation parameter storage 230.

The candidate train line creator 310 creates a candidate train line based on the branch line route information 200 and the main line schedule 210 and stores the created candidate train line in a candidate train line storage 400. The waiting time constraint condition creator 320 creates a waiting time constraint condition as a constraint condition on an optimization process performed by the schedule optimizer 340 while the shuttle constraint condition creator 330 creates a shuttle constraint condition as a constraint condition on the optimization process. The schedule optimizer 340 creates a branch line schedule so as to meet the waiting time constraint and the shuttle constraint conditions as well as a constraint condition based on the branch line schedule creation parameters 230 and stores the created branch line schedule in a branch line schedule storage 410. The vehicle assignment device 350 assigns a vehicle to each piece of train line information in the branch line schedule.

The output GUI 500 integrates the candidate train line in the candidate train line storage 400 with the branch line schedule after a vehicle assignment (or the branch line schedule before the vehicle assignment) in the branch line schedule storage 410 and displays an integration result as output data. The output GUI 500 is a liquid crystal display device, an organic EL display device, a CRT, or the like.

[Details of Input Data and Output Data]

Next, details of input data and output data will be described.

FIG. 4 shows an example of branch line route information 200. The branch line route information 200 includes information about a branch line route. Specifically, the branch line route information 200 includes station names from a starting station to a terminal station, a transfer station (branch line transfer station), position of a depot (rail yard), run time, the shortest turnaround time, and transfer time (layover).

The run time is the time required to run from the starting station to the terminal station, and in the example of FIG. 2, the time required to run along the up train line A1 or A3 or the down train line A2 or A4.

The shortest turnaround time is the minimum value of the turnaround time that has to be allowed when a vehicle runs along a down train line right after running along an up train line or when a vehicle runs along an up train line right after running along a down train line.

The transfer time (layover) is the time required for a transfer from a branch line to a main line or a transfer from a main line to a branch line. In the example of FIG. 2, when the transfer time is 5 minutes, if it is desired to get on the main line departing at 5:53, it is necessary to use an up branch line arriving by 5:48. Conversely, outgoing passengers getting off a main line arriving at 5:53 can use only a down branch line arriving at 5:58 or later.

FIG. 5 shows a train timetable as an example of a main line schedule 210. The main line schedule 210 here includes the departure and arrival times (arrival times and departure times) of trains on both up and down main lines at the main line transfer station 104. According to the present embodiment, as described above, the arrival time and the departure time are assumed to be the same time and are indicated by the same value, but if the arrival time and the departure time differ with a long dwell time, the arrival time and the departure time may be listed separately. In that case, it can be considered that there are outgoing passengers on the train at the arrival time and that passengers who are going to get on the train have to arrive by the departure time. When a train leaves a starting station, a flag may be set at the departure time, indicating that this is the starting station, and when the train arrives at a terminal station, a flag may be set at the arrival time, indicating that this is the terminal station. If a flag indicating a starting station is on at the time of departure, passengers cannot get off the train. Similarly, if a flag indicating a terminal station is on at the time of arrival, no passenger can get on the train. Note that a train on a main line will be also referred to as a main line train.

FIG. 6 shows an example of the number-of-incoming/outgoing-transit-passengers information 220. As anticipated values of the numbers of incoming/outgoing passengers of up and down main line trains in each 30-minute time slot t, the number-of-incoming/outgoing-transit-passengers information 220 in FIG. 6 includes:

the number of passengers transferring from a branch line to an up main line train (the number of incoming up passengers), the number of passengers transferring from a branch line to a down main line train (the number of incoming down passengers), the number of passengers transferring from an up main line train to a branch line (the number of outgoing up passengers), and the number of passengers transferring from a down main line train to a branch line (the number of outgoing down passengers).

Time-slot cells of morning rush hours in which there is a large number of incoming up passengers and a time-slot cells of evening rush hours in which there is a large number of outgoing down passengers are shown in gray. Note that the time slot does not have to be 30 minutes long. A system may be adopted that directly gives the numbers of incoming/outgoing passengers on each main line train (i.e., in relation to each piece of train line information on the main line schedule) rather than in each time slot.

FIG. 7 shows an example of the branch line schedule creation parameters 230. The branch line schedule creation parameters 230 include parameter information about the branch line, where the parameter information is used in creating a branch line schedule. The branch line schedule creation parameters 230 here include the following information:

the number of vehicles possessed by the branch line, an upper limit on the number of vehicles able to dwell simultaneously at the branch line terminal station, and an upper limit on waiting time for passengers and a penalty to be imposed when the upper limit is exceeded (according to the present embodiment, the upper limit and the penalty on the waiting time is the same between transfers from a branch line to a main line and transfers from a main line to a branch line, but may be different).

FIG. 8 shows an example of output data of the present apparatus. The output data is displayed on a screen of the output GUI 500. The output data in FIG. 8 includes a branch line up schedule on the left and a branch line down schedule on the right. The branch line up schedule on the left includes departure times at the branch line terminal station 107 and arrival times at the branch line transfer station 105 and vehicle identifiers (ID) assigned to up train lines as information about the up train lines on the branch line. The branch line down schedule on the right includes information about departure times at the branch line transfer station 105 and arrival times at the branch line terminal station 107 and vehicle identifiers (ID) assigned to down train lines as information about the down train lines on the branch line.

[Creating a branch line schedule]A branch line schedule creation process performed by the branch line schedule creation processor 300 will be described.

Figure 9:
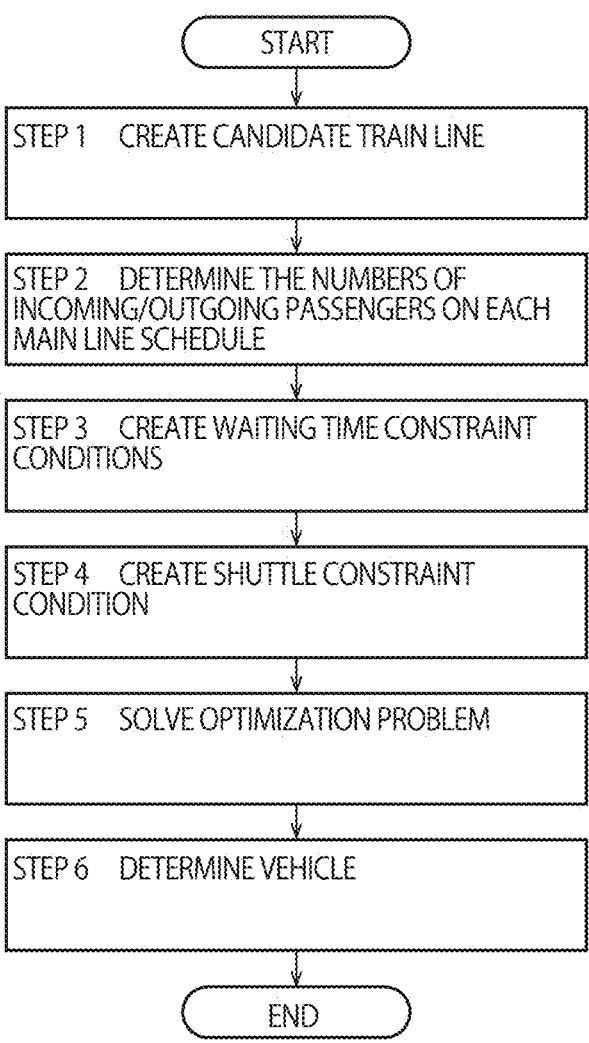
FIG. 9 is a flow chart showing an example of procedures for a branch line schedule creation process.

FIG. 9 is a flow chart showing an example of procedures for the branch line schedule creation process.

The present process is roughly divided into the following six steps.

Step 1: Create a candidate train line
Step 2: Calculate the numbers of incoming/outgoing
    passengers on
each main line schedule
Step 3: Create waiting time constraint conditions
Step 4: Create a shuttle constraint condition
Step 5: Solve an optimization problem (determine up and
    down
branch line train lines)
Step 6: Determine vehicles to be assigned to the up and
    down
branch line train lines.

[Step 1: Creating a Candidate Train Line]

First, based on the main line schedule 210 and the branch line route information 200, the candidate train line creator 310 creates a candidate train line on the branch line schedule to transfer to train line (main line specified) on the main line schedule 210. The candidate train line is a candidate for train line information (second train line information) created as a branch line schedule.

Based on the departure and arrival times on the main line schedule 210 (main line departure and arrival times), the candidate train line creator 310 creates a candidate train line before and after a time serving as a reference. This will be described in more detail using FIG. 10.

Figure 10:
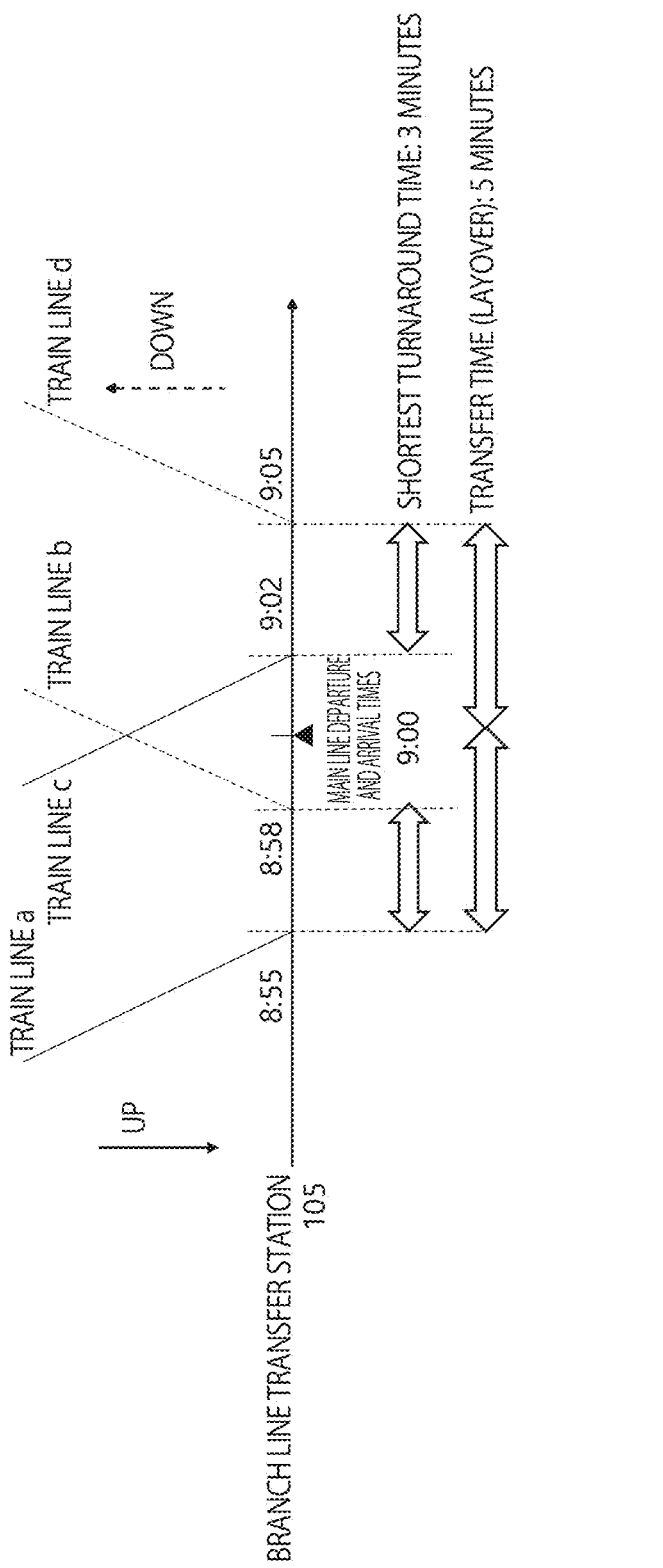
FIG. 10 is an explanatory diagram illustrating an example of creating a candidate train line in Step 1.

FIG. 10 is an explanatory diagram illustrating an example of creating a candidate train line in Step 1.

If the main line departure and arrival times are 9:00 (both the arrival time and departure time are 9:00), the transfer time (layover) is 5 minutes, and the shortest turnaround time is 3 minutes; first, an up train line a arriving at 8:55 is created as a candidate train line that allows the passengers to just catch a main line train (at 9:00), and a down train line d leaving at 9:05 is created as a candidate train line that allows the passengers to just catch a train if the passengers get off the main line train at 9:00.

An up train line b leaving at 8:58 that can shuttle back from the up train line a with the shortest time (the shortest turnaround time) and an up train line c arriving at 9:02 that can shuttle back to the train line d with the shortest time are also created as candidate train lines.

In this way, four candidate train lines a to d are created in relation to the departure and arrival times of the main line train. By allowing for the four candidate train lines, it will be possible to select from the following three schedules:

a schedule that places the top priority on the transport of incoming main line passengers who use the train line a and the train line b or d, a schedule that places the top priority on the transport of outgoing main line passengers who use the train line a or c and the train line d, and a schedule that places similar priorities on incoming main line passengers and outgoing main line passengers who use the train lines a and d while slightly neglecting operation efficiency of the branch line.

Next, assuming that density of train line information in the main line schedule 210 is low (train operation density is low), if candidate train lines are created using only the departure and arrival times of trains as starting points, there can be an unnatural situation in which the turnaround times at the branch line terminal station 107 or the branch line transfer station 105 become too long. Thus, by defining a standard turnaround time (e.g., 20 minutes) beforehand, for example, a candidate train line along which a vehicle arriving at the branch line terminal station 107 will shuttle back in 20 minutes may be added. This will be described in detail below using FIG. 11.

Figure 11:
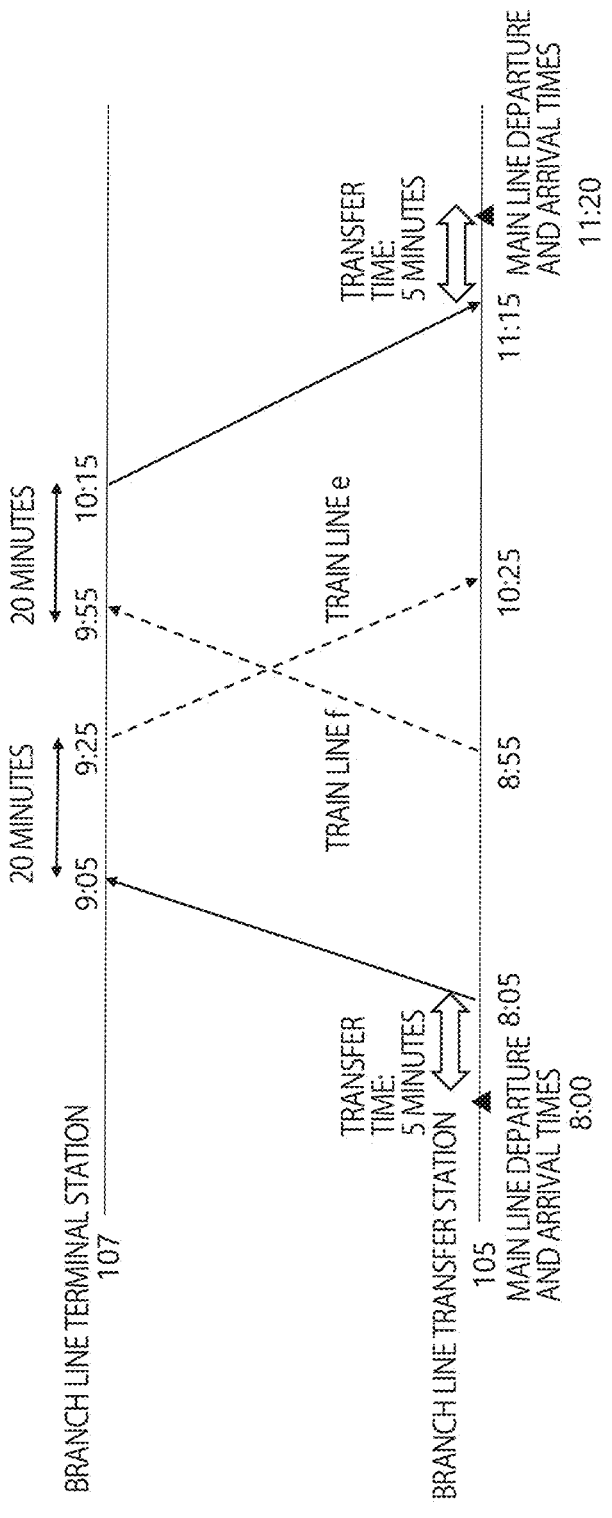
FIG. 11 is an explanatory diagram illustrating another example of creating candidate train lines.

FIG. 11 is an explanatory diagram illustrating another example of creating candidate train lines.

An up train line e leaving the branch line terminal station 107 after an interval of the standard turnaround time (20 minutes) is added to a down branch line train line (leaving a branch line transfer station at 8:05 and arriving at a branch line terminal station at 9:05) connecting directly from a main line train arriving at 8:00. The down branch line train line connecting directly from the main line train is such that the time from the arrival time of the main line train to the departure time of the vehicle on the branch line 102 is equal to or longer than the layover and the departure time of the vehicle on the branch line is temporally closest to the arrival time of the main line train.

a down train line f arriving after staying at the branch line terminal station 107 for the standard turnaround time (20 minutes) is added to an up branch line train line (leaving the branch line transfer station at 10:15 and arriving at the branch line terminal station at 11:15) connecting directly to the main line train leaving at 11:20. The up branch line train line connecting directly to the main line train is such that the time from the arrival time of the vehicle on the branch line 102 to the departure time of the main line train is equal to or longer than the layover and the arrival time is temporally closest to the departure time of the main line train.

Note that the method for creating candidate train lines is not limited to the method described above. For example, a technique for creating candidate train lines at predetermined intervals such as at 10-minute intervals may be adopted. Besides, the interval may be varied according to the number of incoming transit passengers.

Whereas an example in which the standard turnaround time is spent at the branch line terminal station 107 has been shown above, a train line that spends the standard turnaround time at the branch line transfer station 105 may be created. That is, a down train line that shuttles back from the branch line transfer station 105 after the standard turnaround time or an up train line that arrives after staying for the standard turnaround time at the branch line transfer station 105 may be added.

Regarding other methods, if there is a branch line schedule currently in use, train lines defined by the current branch line schedule may be adopted as candidate train lines (details will be described later in other embodiments).

[Step 2: Determining the Numbers of Incoming/Outgoing Passengers on Each Main Line Train]

Based on the number-of-incoming/outgoing-transit-passengers information 220 and the main line schedule 210, the number-of-incoming/outgoing-passengers calculator 360 determines the numbers of incoming/outgoing passengers on each main line train.

Figure 12:
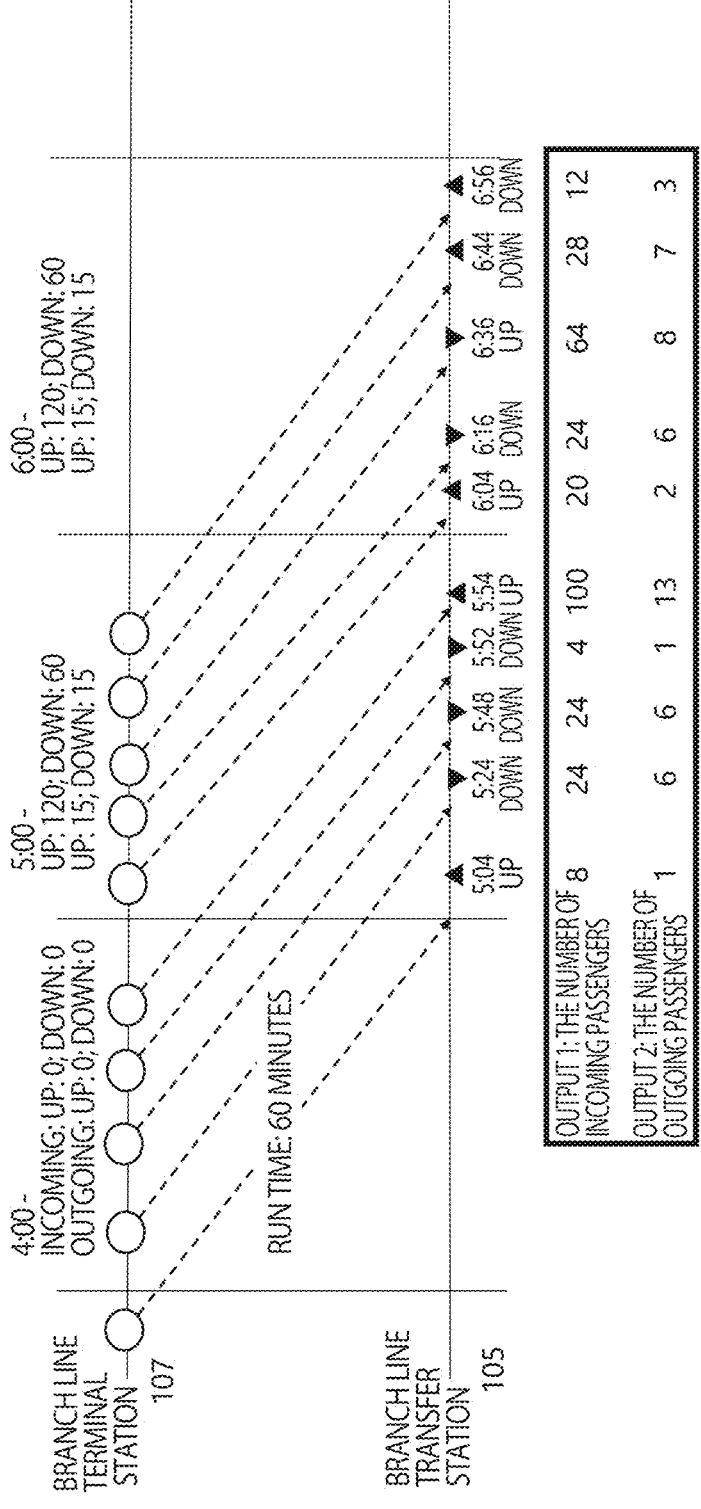
FIG. 12 is a diagram showing an example of determining the numbers of passengers getting on and off each main line train.

FIG. 12 shows an example of determining the numbers of passengers getting on and off each main line train (corresponding to each piece of train line information in the main line schedule 210).

It is assumed here that the number of incoming passengers and the number of outgoing passengers are given by the number-of-incoming/outgoing-transit-passengers information 220 every hour. Besides, for example, between 5:00 and 6:00, there are 120 passengers who want to transfer to an up main line train and 60 passengers who want to transfer to a down main line train. On the other hand, it is assumed that between 5:00 and 6:00, there are 15 passengers who want to get off the up main line train to make a transfer and there are 15 down passengers who want to get off the train to make a transfer. Note that the number-of-incoming/outgoing-transit-passengers information 220 here uses values different from those used in the example of FIG. 6.

The departure and arrival times of up main line trains and the departure and arrival times of down main line trains are also given by the main line schedule 210. In this example, 5:04, 5:54, 6:04, and the like are the departure and arrival times of up main line trains while 5:24, 5:48, 5:52, and the like are the departure and arrival times of down main line trains. It should be noted that main line trains that terminate at the station and do not allow passengers to get on the train are excluded from the trains, of which the number of incoming up passengers are determined, and main line trains that start from the station and do not allow passengers to get off the train are excluded from the trains, of which the number of outgoing passengers are determined.

Since the train leaving at 5:04 is an up main line train, of the 120 passengers anticipated to get on an up main line train for a transfer between 5:00 and 6:00, the number of incoming passengers appearing in the first 4 minutes is adopted as the number of passengers getting on the main line train leaving at 5:04. Specifically, the number of passengers getting on the main line train for a transfer can be calculated using a proportional allotment as follows: 120×4/60=8. On the other hand, between 5:00 and 6:00, since there are 15 passengers anticipated to get off the up main line train for a transfer, the number of passengers getting off the main line train for a transfer can be calculated as follows: 15×4/60=1. Note that whereas calculations have been performed here assuming that passengers are distributed uniformly during one hour, a technique that slopes the passenger distribution by taking into consideration the circumstances before and after this period may be adopted.

Next, regarding the down main line train leaving at 5:24, since the number of passengers getting on the down main line trains and the number of passengers getting off the down main line trains between 5:00 and 6:00 are 60 and 15, respectively, similarly, the number of passengers getting on the train and the number of passengers getting off the train are calculated as 60×24/60=24 and 15×24/60=6, respectively.

Furthermore, regarding the next down main line train leaving at 5:48, since the number of passengers getting on the down main line trains and the number of passengers getting off the down main line trains between 5:00 and 6:00 are 60 and 15, respectively, making it enough to consider only the number of incoming and outgoing passengers between 5:24 and 5:48, the number of passengers getting on the train and the number of passengers getting off the train are calculated as 60×(48−24)/60=24 and 15×(48−24)/60=6, respectively.

[Step 3: Creating Waiting Time Constraint Conditions]

Based on the main line schedule 210, the created candidate train lines, and the branch line route information 200, the waiting time constraint condition creator 320 creates waiting time constraint conditions. The waiting time constraint conditions define how much waiting time is required by passengers who make a transfer, based on main line train lines and candidate train lines, which make up sets of a transfer source and a transfer destination. The waiting time constraints are expressed specifically by Equations (4) to (7) of an optimization problem describe later. The waiting time will be described here.

The waiting time will be discussed by taking as an example some of the candidate train lines created in Step 1. The concept of the waiting time for incoming and outgoing passengers will be described. The waiting time is the period for which passengers have to wait beyond the transfer time (layover) defined by the branch line route information 200. In the present example, it is assumed that the transfer time is 5 minutes.

Figure 13:
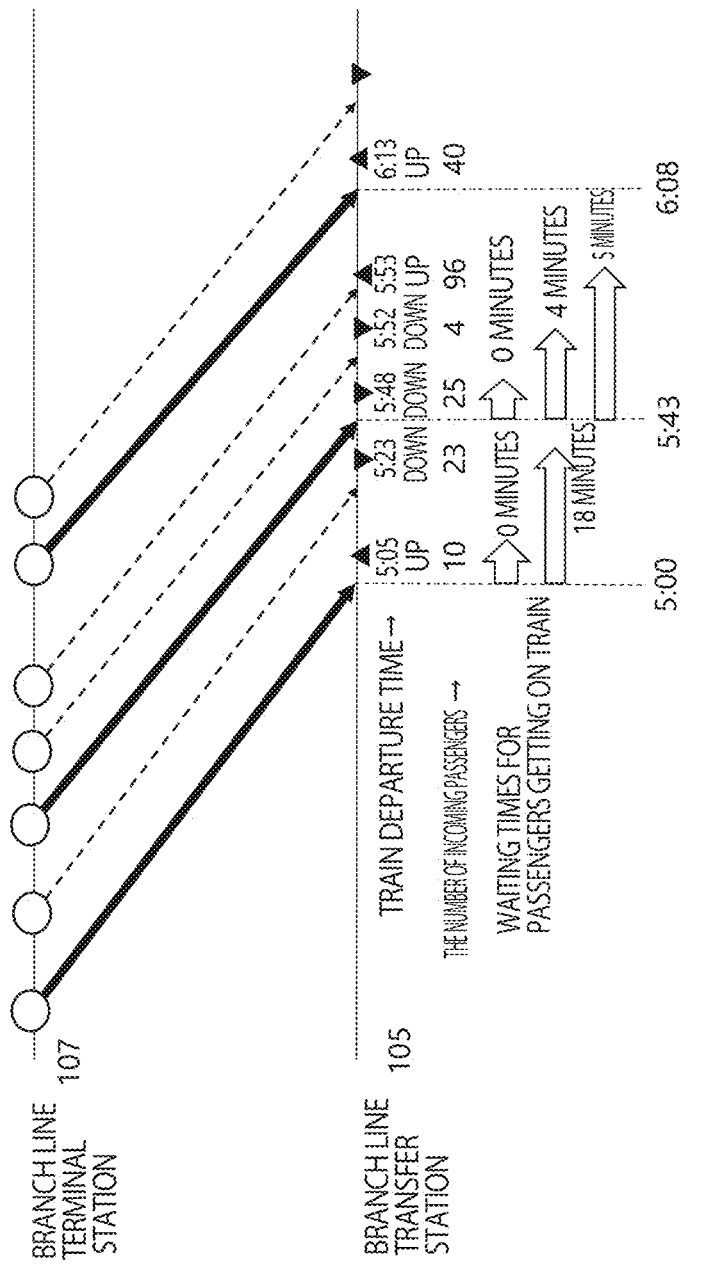
FIG. 13 is a diagram showing an example of a concept of waiting time for an up branch line.

FIG. 13 shows an example of a concept of waiting time for an up branch line. Of candidate train lines, the candidate train lines that arrive at 5:00, 5:43, or 6:08 and allow passengers to connect with three main line trains with zero waiting time will be taken as an example here. Here, if attention is focused on the candidate train line arriving at 5:00, the waiting time for the 10 passengers who intend to take the up main line train leaving at 5:05 is 0 minutes by subtracting the transfer time of 5 minutes from the difference between 5:05 and 5:00. Regarding the 23 passengers who intend to take the down main line train leaving at 5:23, in order to come to the branch line transfer station 105 (to connect to the up main line train arriving at 5:05), since there is no choice but to take the up branch line arriving at 5:00, the waiting time is 18 by subtracting the transfer time of 5 minutes from the difference between 5:23 and 5:00.

Figure 14:
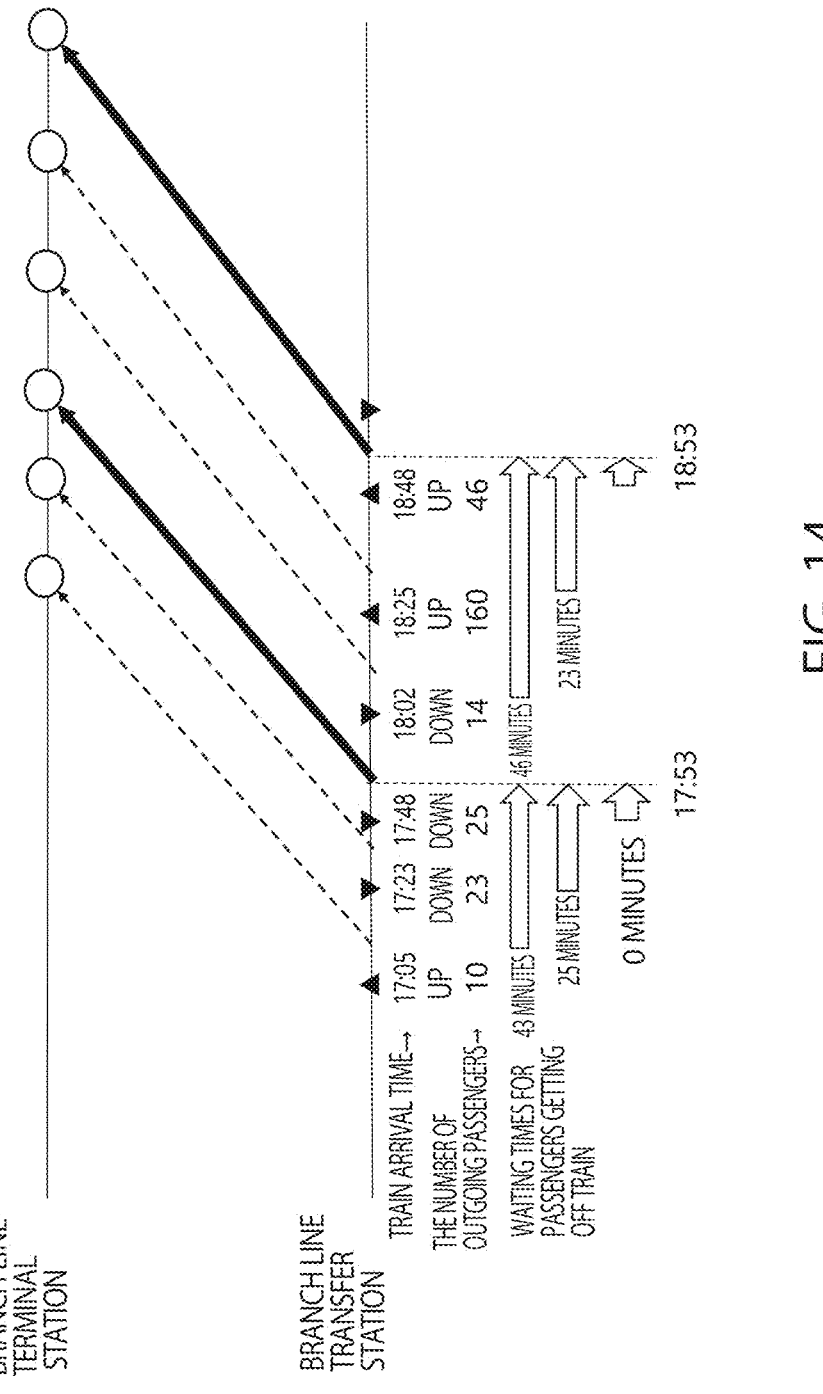
FIG. 14 is a diagram showing an example of a concept of waiting time for a down branch line.

FIG. 14 shows an example of a concept of waiting time for a down branch line.

Of candidate train lines, the candidate train lines that leave at 17:53 or 18:53 and allow passengers to connect with two main line trains with zero waiting time will be taken as an example here. Here, if attention is focused on the candidate train line leaving at 17:53, the waiting time for the 25 passengers getting off the down main line train arriving at 17:48 is 0 minutes. Regarding the 23 passengers getting off the previous down main line train arriving at 17:23, since there is no choice but to take the branch line leaving at 17:53, the waiting time is 25 minutes by subtracting the transfer time of 5 minutes from the difference between 17:53 and 17:23.

In this way, in the case of a transfer from an up branch line, the waiting time is found by subtracting the transfer time from the time elapsed from the arrival time of an up branch line arriving before the departure time of the main line train the passenger intends to get on. In the case of a transfer to a down branch line, the waiting time is found by subtracting the transfer time from the time elapsed from the arrival time of the main line train which the passenger got off until the departure time of the down branch line.

[Step 4: Creating a Shuttle Constraint Condition]

The shuttle constraint condition creator 330 creates a shuttle constraint condition for the branch line transfer station 105 and the branch line terminal station 107.

Figure 15:
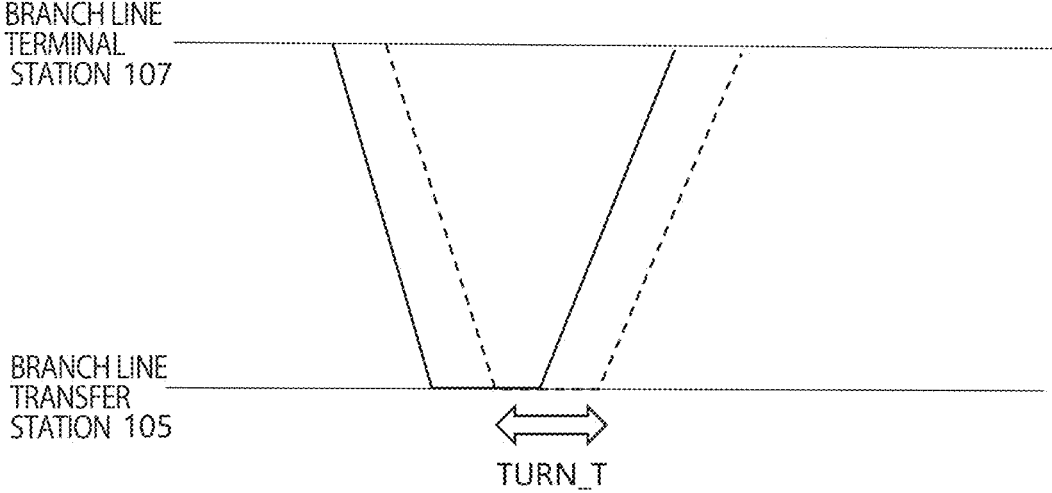
FIG. 15 is a diagram for explaining a shuttle constraint condition at a branch line transfer station.

FIG. 15 is a diagram for explaining a shuttle constraint condition at the branch line transfer station 105.

If the shortest turnaround time at the branch line transfer station 105 is TURN_T (minutes), Equation (1) below should hold at any time t.

$$\text{The total number of departures up to time } t \leq S + \text{the total number of arrivals up to time } (t - \text{TURN\_}T) \qquad (1)$$

S is the total number of vehicles on the branch line. It is assumed that all the vehicles are put in the depot 108 at the branch line transfer station 105 in the midnight hours. Note that at the last time t, the total number of departures up to time t matches the total number of arrivals up to time t. Equation (1) corresponds to the shuttle constraint condition at the branch line transfer station 105.

Figure 16:
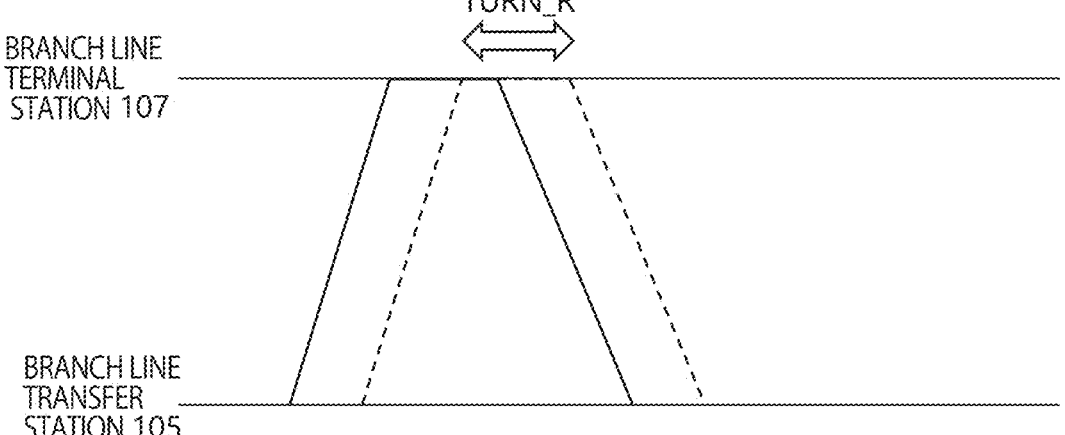
FIG. 16 is a diagram for explaining a shuttle constraint condition at a branch line terminal station.

FIG. 16 is a diagram for explaining a shuttle constraint condition at the branch line terminal station 107.

If the shortest turnaround time of a vehicle at the branch line terminal station 107 is TURN_R (minutes) and the number of vehicles able to dwell simultaneously (maximum number of vehicles able to dwell simultaneously) at the branch line terminal station 107 is PLATFORMS, Equation (2) below should hold at any time t.

$$\text{The total number of departures up to time } (t - \text{TURN\_}R) \text{ the total number of arrivals up to time } t \leq \text{PLATFORMS} \qquad (2)$$

For example, when PLAT_FORMS=2, it is permissible that two vehicles dwell simultaneously at the branch line terminal station 107. However, it is necessary to leave TURN_R minutes or more between the arrival time of a vehicle and the departure time of the vehicle.

Equation (1) and Equation (2) above are presented as Equation (8) and Equation (9) in the optimization problem describe later.

FIG. 17 shows examples of constraint conditions forbidding an inappropriate shuttle service as other examples of shuttle constraint conditions.

Example 1 in FIG. 17 is an example of constraint conditions that forbid a situation of simultaneous departure and arrival in which the departure time and arrival time of a plurality of different vehicles coincide at the branch line transfer station 105, a situation in which time $\Delta t1$ from the departure of one vehicle to the arrival of another vehicle is short, and a situation in which time $\Delta t2$ from the arrival time of one vehicle to the departure time of another vehicle is short. For example, a constraint condition can be created to forbid such a combination of candidate train lines that the differential time ($\Delta t1$ or $\Delta t2$) between the arrival time and the departure time of different vehicles will be within a predetermined time at the branch line transfer station 105. A minimum permissible differential time may be a predetermined value such as 2 minutes or other times.

Example 2 in FIG. 17 is an example of constraint conditions that forbid a situation of simultaneous departure and arrival in which the departure time and arrival time of a plurality of different vehicles overlap at the branch line terminal station 107, a situation in which time $\Delta t3$ from the arrival time of one vehicle to the departure time of another vehicle is short, and a situation in which time $\Delta t4$ from the departure time of one vehicle to the arrival time of another vehicle is short. For example, a constraint condition may be created to forbid such a combination of candidate train lines that the differential time ($\Delta t3$ or $\Delta t4$) between the arrival time and the departure time of different vehicles will be within a predetermined time at the branch line terminal station 107. A minimum permissible differential time may be a predetermined value such as 2 minutes or other times.

The constraint conditions shown in FIG. 17 are presented as Equation (10) in the optimization problem describe later.

[Step 5: Formulation and Solution by Mixed Integer Programming]

Based on a set of the candidate train lines created in Step 1 and the numbers of incoming and outgoing passengers of respective main line trains created in Step 2 and using a function that represents the sum total of waiting times for incoming and outgoing passengers as an objective function, the schedule optimizer 340 generates a mixed integer programming model as an optimization problem that minimizes or quasi-minimizes the objective function. By solving this model, it is possible to determine which candidate train lines should be adopted (selected) as train lines to be actually used in the branch line out of the set of candidate train lines created in Step 1. The objective function is used in calculating an evaluation index regarding the total waiting time for passengers at a branch line transfer station or a main line transfer station at the time of a transfer from the main line transfer station to the branch line transfer station or from the branch line transfer station to the main line transfer station. Examples of the model will be shown below.

$$\text{min.} \sum\nolimits_{i\in \mathcal{I}_{up*}} A_i \cdot v_i + \sum\nolimits_{i\in \mathcal{I}_{down*}} B_i \cdot w_i \tag{3}$$

$$\text{s.t. } (Arv(i) - Arv(j)) \cdot \left( x_j - \sum\nolimits_{k:j+1\le k\le i} x_k \right) \le v_i, \ \forall\, j \in \{j : j > i,\, j \in \mathcal{I}_{up}\},\, \forall\, i \in \mathcal{I}_{up*} \tag{4}$$

$$M \cdot \left( 1 - \sum\nolimits_{k:k\le i} x_k \right) \le v_i, \ \forall\, i \in \mathcal{I}_{up*} \tag{5}$$

$$(Dep(j) - Dep(i)) \cdot \left( y_j - \sum\nolimits_{k:i\le k\le j-1} y_k \right) \le w_i, \forall\, j \in \{j : j > i,\, j \in \mathcal{I}_{down}\},\, \forall\, i \in \mathcal{I}_{down*} \tag{6}$$

$$M \cdot \left( 1 - \sum\nolimits_{k:i\le k} y_k \right) \le \omega_i, \ \forall\, i \in \mathcal{I}_{down*}, \tag{7}$$

$$0 \le \sum\nolimits_{i:Dep(i)\le t,\, i\in \mathcal{I}_{up}} x_i - \sum\nolimits_{i:Arv(i)\le t,\, i\in \mathcal{I}_{down}} y_i \le S, \ \forall\, t \in T_1, \tag{8}$$

$$0 \le \sum\nolimits_{i:Dep(i)\le t,\, i\in \mathcal{I}_{down}} y_i - \sum\nolimits_{i:Arv(i)\le t,\, i\in \mathcal{I}_{up}} x_i \le T, \ \forall\, t \in T_0, \tag{9}$$

$$x_i + y_j \le 1, \ \forall\, (i, j) \in NGSet, \tag{10}$$

$$x_i \in \{0, 1\},\, v_i \ge 0, \ \forall\, i \in \mathcal{I}_{up}, \tag{11}$$

$$y_i \in \{0, 1\},\, \omega_i \ge 0, \ \forall\, i \in \mathcal{I}_{down}. \tag{12}$$

Definitions of symbols are shown below.

Variable $x_i$: a variable that determines whether to make a branch line vehicle run along a candidate up train line i (the value of the variable is 0 or 1)

Variable $y_i$: a variable that determines whether to make a branch line vehicle run along a candidate down train line i (the value of the variable is 0 or 1)

Variable $v_i$: waiting time for incoming passengers transferring from a vehicle on a candidate up train line to a train on a main line train line (which is closest to the candidate up train line in terms of arrival time among main line train lines separated from the departure time of the candidate up train line i by an interval equal to or larger than a transfer time) connecting directly to the candidate up train line i. The main line train lines may be either an up or down train line.

Variable $w_i$: waiting time for outgoing passengers getting off to transfer to a vehicle on a candidate down train line from a train on a main line train line (which is closest to the candidate down train line in terms of arrival time among main line train lines separated from the departure time of the candidate down train line i by an interval equal to or larger than a transfer time) connecting directly to the candidate down train line i. The main line train lines may be either an up or down train line.

Iup: a set of all candidate up train lines

Idown: a set of all candidate down train lines

Iup*: a set of those candidate up train lines which connect directly to the departure time of a main line train Idown*: a set of those candidate down train lines which connect directly from the arrival time of a main line train Ai: the number of incoming passengers transferring from a vehicle on the candidate up train line i to a train on a main line train line (which is temporally closest to the candidate up train line in terms of departure time among main line train lines separated from the candidate up train line by an interval equal to or larger than a transfer time) connecting directly to the candidate up train line i Bi: the number of incoming passengers transferring from a train on a main line train line (which is temporally closest to the candidate down train line in terms of departure time among main line train lines separated from the candidate down train line by an interval equal to or larger than a transfer time) to a vehicle of the candidate down train line i connecting directly to the candidate down train line i S: the number of vehicles possessed by a branch line T: the number of vehicles able to dwell simultaneously at the branch line terminal station Dep(i): the departure time of a branch line caused to run along the train line i Arv(i): the arrival time of a branch line caused to run along the train line i T0: a set of departure and arrival times of the candidate up train lines leaving a branch line terminal station T1: a set of departure and arrival times of the candidate down train lines leaving a branch line transfer station M: a sufficiently large constant NGSet≡{(i,j):i∈I_up,j∈I_(down) |Dep(i)–Arv(j)|<3 or |Arv(i)–Dep(j)|<3}

According to the above definitions, the set of candidate train lines created in Step 1 are (Iup,Idown) and the numbers of incoming and outgoing passengers of respective main line trains created in Step 2 are (Ai,Bi).

Equation (3) represents minimization of the sum total of waiting times for passengers.

Constraint equations (4) to (7) represent the waiting time constraint conditions described in Step 3.

Constraint equation (4) represents a waiting time constraint that applies when a passenger intending to get on a main line train connecting directly to the up train line i gets on an up branch line vehicle earlier than the train line i. Specifically, if a train line j is adopted and train lines j+1 to i are not adopted (i.e., $x_j$=1 and $\Sigma_{(k:j+1\leq k\leq i)}X_k$=0), the passenger intending to get on the main line train connecting directly to the up train line i has no choice but to take a branch line vehicle on the train line j, and consequently waiting time Arv(i)-Arv(j) occurs. This is represented by constraint equation (4).

Constraint equation (5) represents a waiting time constraint condition that applies when a passenger intending to get on a main line train connecting directly to the up train line i cannot get on the main line train (because an earlier branch line is not available). Specifically, if none of the train line i and earlier branch lines is adopted, it is considered that a long waiting time M will occur. Note that M is a sufficiently large value.

As with constraint equation (4), constraint equation (6) represents a waiting time constraint that applies when a passenger getting off a main line train connecting directly to the down train line i gets on a down branch line vehicle later than the train line i. Specifically, if the train line j is adopted and branch lines i to j−1 are not adopted (i.e., $y_j$=1 and $\Sigma_{(k:i\leq k\leq j-1)}Y_k$=0), the passenger getting off a main line train connecting directly to the down train line i has no choice but to take a branch line vehicle on the train line j, and consequently waiting time Dep(j)-Dep(i) occurs. This is represented by constraint equation (6).

As with constraint equation (5), constraint equation (7) represents a constraint condition that applies when a passenger getting off a main line train connecting directly to the down train line i cannot return home from the station (because no branch line is running (a branch line vehicle is not available) later than this time). Specifically, if none of the train line i and later branch lines is adopted, it is considered that a long waiting time M will occur. Note that M is a sufficiently large value.

Constraint equations (8) to (10) represent the shuttle constraint conditions described in Step 4.

First, constraint equation (8) shows that the number of vehicles at the branch line transfer station 105 can be between 0 and S (both inclusive). Equation (8) also shows that the maximum number of vehicles on the branch line 102 is equal to or smaller than S. Constraint equation (9) shows that the number of vehicles at the branch line terminal station 107 can be between 0 and T (both inclusive). Note that although omitted here, to make sure that all the vehicles will be in a depot (at the branch line transfer station 105) in the nighttime and other time slots when the vehicles are out of service, constraints may be added stipulating that at the start and end of each day's operation, the number of vehicles at the branch line terminal station 107 will be exactly S and the number of vehicles at the branch line transfer station 105 will be exactly 0.

As described in Step 4, constraint equation (10) represents a constraint that does not permit such a combination of candidate train lines that the differential time between arrival time and departure time will be equal to or shorter than a predetermined value (such as 2 minutes).

Constraint equation (11) represents a constraint that dictates that the variable "x" be either 0 or 1 and a constraint that dictates that "$v_i$" be non-negative. Similarly, constraint equation (12) represents a constraint that dictates that the variable "y" be either 0 or 1 and a constraint that dictates that "$w_i$" be non-negative.

Under the various types of constraint conditions described above, based on an objective function, by optimizing or quasi-optimizing an evaluation index regarding the total waiting time for passengers, the schedule optimizer 340 selects one or more branch line train lines from a plurality of candidate train lines. More specifically, the schedule optimizer 340 sets a coefficient (which corresponds to Ai or Bi described above) that represents the number of passengers transferring from a main line transfer station to a branch line transfer station or from a branch line transfer station to a main line transfer station when candidate train lines are selected, and sets a first variable (which corresponds to "$v_i$" or "$w_i$" described above) that represents the waiting time for a transfer from a main line transfer station to a branch line transfer station or from a branch line transfer station to a main line transfer station when candidate train lines are selected. Then, using the coefficient and the first variable, the schedule optimizer 340 generates a function of an evaluation index regarding the total amount of waiting time for passengers. Under the constraint conditions that concern the waiting time for passengers and use a plurality of second variables (variable "$x_i$" and variable "$y_i$") that represent a binary regarding whether to select each of the plurality of candidate train lines, by optimizing or quasi-optimizing an objective function, the schedule optimizer 340 calculates values of the plurality of second variables and selects one or more branch line train lines from the candidate train lines based on the values of the plurality of second variables.

If all the constraint conditions cannot be satisfied with respect to the mathematical model described above, the schedule optimizer 340 may output data indicating why the constraint conditions cannot be satisfied.

Note that the formulation shown above is exemplary, and another objective function or constraint equation may be used. Besides, a mathematical programming solver such as GurobiOptimizer or CPLEX may be used in the process of solving the optimization problem. Regarding a solution, a metaheuristic solution such as a gradient method, SimulatedAnnealing, GeneticAlgorithm may be used. The mathematical programming solver may be made up of an outside server connected to the present apparatus via a network such as the Internet. In that case, the present apparatus transmits data of the optimization problem to the mathematical programming solver and acquires data of a solution found by the mathematical programming solver.

[Step 6: Assigning a Vehicle]

Train lines (branch line train lines) to be actually used in the branch line 102 have been obtained in steps up to Step 5. In Step 6, the vehicle assignment device 350 determines which vehicles are to be assigned to which train lines (which vehicles are to run on which branch line train lines). For example, this process can be performed by assigning vehicles to the branch line transfer station 105 or branch line terminal station 107 of each branch line based on some logic such as last in, first out or first in, first out.

Figure 18:
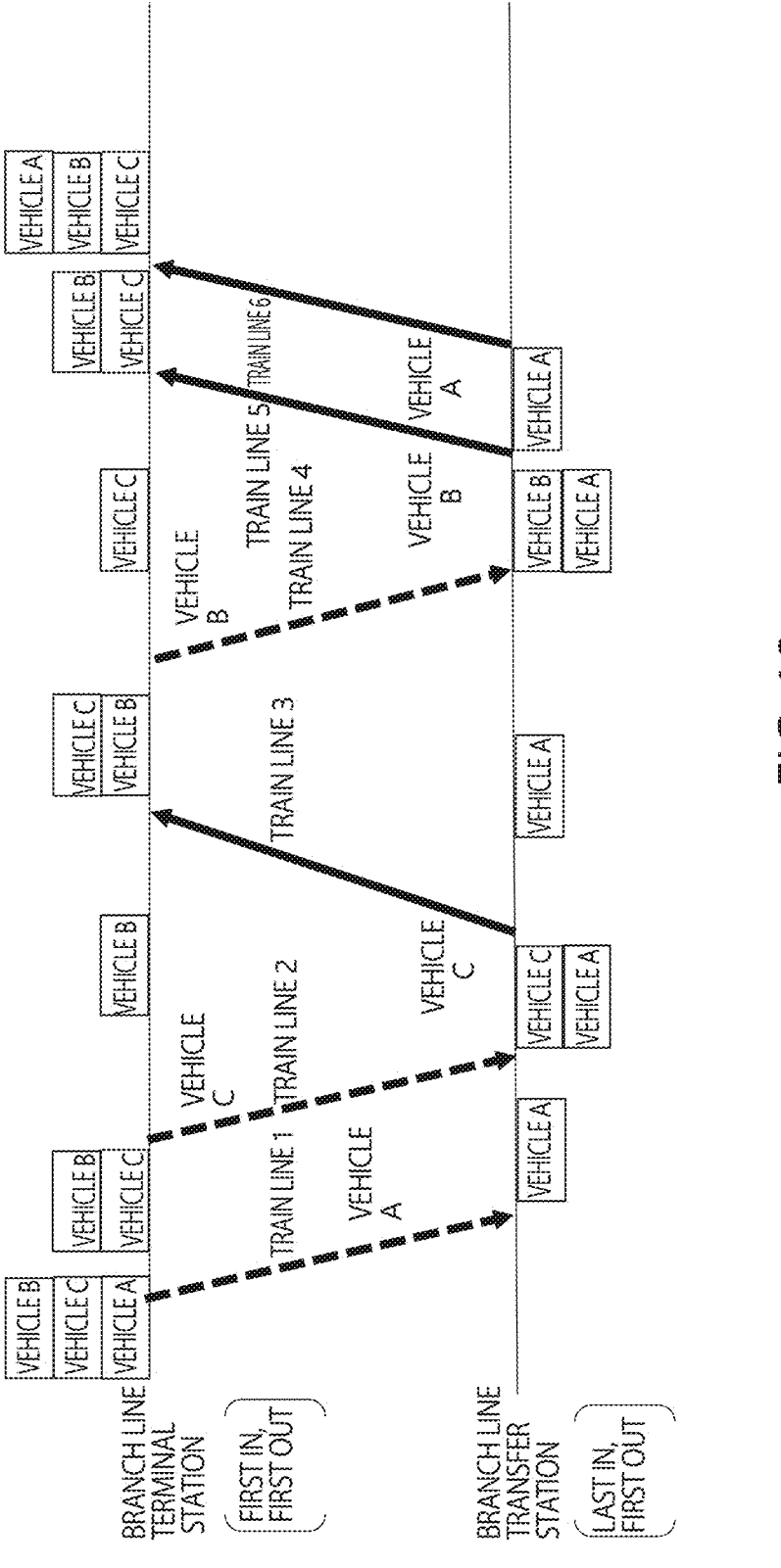
FIG. 18 is a diagram showing an example of vehicle assignment.

FIG. 18 shows an example of vehicle assignment.

It is assumed that train lines 1 to 6 shown in FIG. 18 have been adopted by solving the optimization problem described above. It is assumed that three vehicles A to C are placed at the branch line terminal station 107 at first. In this case, a vehicle to be assigned to each train line is determined based on a last-in first-out rule at the branch line transfer station 105 and based on a first-in first-out rule at the branch line terminal station 107.

The last-in first-out rule is a scheme whereby the last vehicle that has arrived is the first vehicle to leave. The scheme is intended to use the first vehicle on a priority basis whenever possible at the branch line transfer station 105 by keeping subsequent vehicles in reserve and consequently reduce the number of vehicles to be used, as much as possible. The first-in first-out rule is a scheme whereby the first vehicle that has arrived is the first vehicle to leave. The scheme is intended to use vehicles in order beginning with the first vehicle arriving at the branch line terminal station 107.

It is assumed that initially vehicles A, C, and B are arranged in this order at the branch line terminal station 107. In this case, on train line 1 (up), vehicle A at the head of the branch line terminal station 107 is used, and runs to the branch line transfer station 105. Next, on train line 2 (up), vehicle C at the head of the branch line terminal station 107 is used, and runs to the branch line transfer station 105. Upon arriving at the branch line transfer station 105, vehicle C is placed atop vehicle A that has arrived earlier than vehicle C.

Next, on train line 3 (down), since the last-in first-out rule is applied, vehicle C, which has arrived last at the branch line transfer station 105, is used. Next, on train line 4 (up), since the first-in first-out rule is applied, vehicle B staying at the branch line terminal station 107 from the beginning is used, and runs to the branch line transfer station 105. Upon arriving at the branch line terminal station 107, vehicle B is placed atop vehicle A. Next, on train line 5 (down), since the last-in first-out rule is applied, vehicle B located on the top tier at the branch line transfer station 105 is used. Upon arriving at the branch line terminal station 107, vehicle B is placed above vehicle C, which has arrived earlier than vehicle B. Next, on train line 6 (up), the only remaining vehicle A is used.

Note that if shuttle constraint equations (8) and (9) are satisfied in the optimization problem processed in Step 5, because it is guaranteed at the beginning of the train line that there is at least one vehicle, a vehicle can be assigned without fail no matter what rule may be used out of rules including the first-in first-out rule and the last-in first-out rule.

The processes of Steps 1 to 6 above provide an optimal solution or suboptimal solution to the problem of minimizing the waiting time for passengers.

[Concrete Examples of the Processes of Steps 1 to 6]

Description will be given of exemplary results of processes in Steps 1 to 6 produced when a main line schedule and number-of-incoming/outgoing-transit-passengers information are inputted in relation to the branch line 102 such as shown in FIG. 1. It is assumed that the number of vehicles available for use on the branch line 102 is two. Values of the main line schedule and number-of-incoming/outgoing-transit-passengers information are partially or totally different from the values in FIGS. 5 and 6. For example, there may be up train times and down train times on the main line schedule between 4:00 and 5:00 as well. Besides, the transfer time may be 2 minutes, 3 minutes, or the like, different from 5 minutes described above.

Candidate up train lines and candidate down train lines (information about departure and arrival times) are created as processing results of Step 1, and the number of incoming passengers and the number of outgoing passengers of each train line on the main line schedule are calculated as processing results of Step 2.

FIG. 19 shows an example of candidate up and down train lines created in the process of Step 1. The number of incoming and outgoing passengers (the total number of incoming and outgoing passengers of the main line train lines connected directly) calculated in the process of Step 2 are shown in FIG. 19 by being associated with the up and down train lines.

Based on data in FIG. 19, the optimization problem can be set up by the formulation in Step 5 that puts together Step 3 and Step 4. When the optimization problem is solved, results such as shown in tables in FIG. 20 are obtained.

FIG. 20 shows an example of branch line schedules created by assigning a vehicle to each of the up train lines and down train lines adopted in the optimization problem. The left table shows a branch line up schedule and the right table shows a branch line down schedule. The number S of vehicles is 2.

As a result of solving the optimization problem, if $x_i=1$, this means that the candidate up train line i is adopted (a branch line vehicle is made to run along the candidate up train line i), and thus the "Adopted Candidate Train Line" column of the branch line up schedule on the left contains "*." Similarly, when $y_i=1$, this means that the candidate down train line i is adopted (a branch line vehicle is made to run along the candidate train line i) and thus the "Adopted Candidate Train Line" column of the branch line down schedule on the right contains "*." In the schedules on the left and right, "u" in the "Connection" column means that the candidate train line has been created directly from the up main line train line, "d" means that the candidate train line has been created directly from the down main line train line, and "." means that the candidate train line has been created by another method. "2" directly under both "Adopted Candidate Train Line" and "Waiting Time" means that the number of vehicles is 2. In the schedules on the left and right, the departure time and the arrival time are the departure time and arrival time of train lines on each schedule. "Number of Incoming Passengers" is the number of passengers getting on the main line train line from an appropriate branch line up train line (i.e., the number of passengers intending to transfer from the up branch line to the main line) and "Number of Outgoing Passengers" is the number of passengers getting off the main line train line to transfer to an appropriate branch line down train line (i.e., the number of passengers intending to transfer from the main line to a down branch line).

Since "$v_i$" is the waiting time for incoming passengers transferring to a main line train connecting directly to the candidate up train line i, values of the waiting time are written into the "Waiting Time" column of the left table. For example, the first row of the branch line up schedule corresponds to an adopted candidate up train line i. The candidate up train line with an ID of 0 (arriving at 5:00) is connected directly to a main line train (leaving at 5:05), allowing incoming passengers to transfer to the main line train with a waiting time of 0 minutes. Besides, for example, the candidate train line with an ID of 6 (arriving at 5:48) on the branch line up schedule corresponds to an unadopted candidate up train line i. Incoming passengers intending to get on the main line train connecting directly to the candidate up train line i has no choice but to get on a vehicle on the candidate up train line with an ID of 0 in the first row. After the vehicle arrives at a branch line transfer station, the incoming passengers will wait until the departure time of the main line train, and thus the waiting time is 48 minutes. That is, the incoming passengers can transfer to the main line train connecting directly to the candidate train line with an ID of 6 with a waiting time of 48 minutes. The value obtained by multiplying the waiting time by the number of incoming passengers on the train line is the waiting time for the train line and the sum total of the waiting times of all the up train lines is the sum total of the waiting times for incoming up passengers. Note that the number of incoming passengers, which is the number of persons intending to transfer to the main line from vehicles, is defined for candidate up train lines connecting to the main line. For example, in the case of the train line with an ID of 0, the number of incoming passengers is 5, and in the case of the train line with an ID of 2, the number of incoming passengers is 23. Since the number of incoming passengers is not defined for IDs of train lines not connected directly to the main line, and thus the "Waiting Time" fields are also left empty (in the optimization process described above, the number of incoming passengers is also calculated based on this idea).

"Number of Incoming Passengers" and "Waiting Time" in the left table will be further described additionally. The left table shows persons who intend to get on the main line by going to the branch line transfer station 105 on an up branch line vehicle. "Number of Incoming Passengers" shows the number of persons who intend to get on the main-line side when there is any main line ("Connection") corresponding to an up train line.

The branch line candidate train line id=0 connects to an up (u) main line leaving at 5:05. The number of persons who intend to transfer to the main line is 5. Because the candidate train line id=0 has been adopted in the current solution, the waiting time for the five persons is 0 minutes.

There is no main line to connect to from a branch line candidate train line with an ID of 1. It is considered here that there is no one who intends to get on a vehicle on the branch line candidate train line with an ID of 1 because when a passenger intends to get on a down main line, the waiting time is shorter if the passenger gets on a vehicle on a branch line candidate train line with an ID of 4 and when a passenger intends to get on an up main line, the waiting time is shorter if the passenger gets on a vehicle on the branch line candidate train line with an ID of 6. Therefore, the number of incoming passengers is 0 and the "Waiting Time" fields are left empty. Because Iup* (a set of those candidate up train lines that are directly connected to the departure time of a main line train) and Idown* (a set of those candidate down train lines that are directly connected from the arrival time of a main line train) are handled in Equation (3) of optimization described above, the branch line candidate train line with an ID of 1 and other train lines that have no direct connection to a main line are excluded from calculations of Equation (3).

The branch line candidate train line with an ID of 2 connects to a down (u) main line leaving at 5:23. The number of persons who intend to transfer to the main line is 23. The candidate train line with an ID of 2 is not adopted in the current solution, and to get on the main line, there is no choice but to go to a branch line transfer station by taking the branch line with an ID of 0 and then wait at the branch line transfer station until 5:23. Therefore, the waiting time is 18 minutes, which is the difference in waiting time between the 5:00 line and the 5:18 line. Note that in the left table, "Number of Incoming Passengers" contain constants, the values of which do not change regardless of the solution obtained by optimization, and even if IDs other than a combination of 0, 9, 20, and 28 are obtained as a solution, the values are unchangeable. The values of "Waiting Time" can vary according to the solution obtained by optimization, and if IDs other than the combination of 0, 9, 20, and 28 are obtained as a solution, the waiting times for the train lines can change from the values listed in the left table.

Similarly, since $w_i$ is the waiting time for outgoing passengers transferring from a main line train connecting directly to the candidate down train line i, values of the waiting time are written into the "Waiting Time" column of the right table. For example, the second row of the branch line down schedule corresponds to an adopted candidate down train line i. The candidate down train line with an ID of 1 is connected directly to a main line train (e.g., arriving at 5:00), allowing passengers to transfer to a down branch line leaving at 5:10 with a waiting time of 0 minutes. The value obtained by multiplying the waiting time by the number of passengers on the train line is the waiting time for the train line and the sum total of the waiting times of all the down train lines is the sum total of the waiting times for down passengers. Note that the number of outgoing passengers, which is the number of persons intending to transfer to a branch line by getting off the main line, is defined for candidate down train lines connecting to the main line. For example, in the case of the train line with an ID of 1, the number of outgoing passengers is 5, and in the case of the train line with an ID of 3, the number of outgoing passengers is 23. Since the number of outgoing passengers is not defined for train lines not connected directly to the main line, and thus the "Waiting Time" fields of the corresponding IDs are also left empty (in the optimization process described above, the number of outgoing passengers is also calculated based on this idea).

"Number of Outgoing Passengers" and "Waiting Time" in the right table will be further described additionally. The right table shows persons who intend to transfer to a down branch line by getting off the main line at a branch line transfer station. "Number of Outgoing Passengers" shows the number of outgoing passengers (who intend to get off) on the main-line side when there is any corresponding down branch line ("Connection").

The branch line candidate train line with an ID of 0 connects from the up (u) main line leaving at 5:05. The number of persons who intend to get off the main line is 5. Because the candidate train line with an ID of 1 has been adopted in the current solution, the waiting time for the five persons is 0 minutes.

There is no main line to connect to the branch line candidate train line with an ID of 2. Therefore, the number of outgoing passengers is 0 and the "Waiting Time" fields are left empty. The concepts about the number of outgoing passengers being 0 and the "Waiting Time" fields being left empty are the same as the description of the left table, and thus description thereof will be omitted.

A branch line candidate train line with an ID of 3 connects from a down (u) main line leaving at 5:23. The number of persons who intend to transfer to a branch line by getting off the main line is 23. The candidate train line with an ID of 2 is not adopted in the current solution, and the passengers getting off the main line have no choice but to wait for a currently adopted candidate train line with an ID of 9 leaving at 5:58. Therefore, the waiting time is 30 minutes, which is the difference in waiting time between the 5:28 line and the 5:58 line.

In Step 6 (vehicle assignment), train lines that meet $x_i=1$ or $y_i=1$ can be connected in order using two vehicles (vehicle A and vehicle B). A concrete example is shown in FIG. 21.

To indicate which down train lines and up train lines have been assigned to the two vehicles (vehicle A and vehicle B) in FIG. 20, FIG. 21 shows an example of train lines along which respective vehicles run, where the train lines are connected in order by arrowed lines. For example, vehicle A runs along an up branch line train line with an ID of 0, a down branch line train line with an ID of 1, an up branch line train line with an ID of 20, and a down branch line train line with an ID of 23 in order. Vehicle B runs along an up branch line train line with an ID of 9, a down branch line train line with an ID of 9, and an up branch line train line with an ID of 28 in order.

In relation to the branch line down schedule and the branch line up schedule obtained such as shown in FIG. 20, an average waiting time, an average vehicle occupancy rate, and other data may be calculated. These calculated values may be displayed on an output screen.

[Example of Output Screen]

Figure 22:
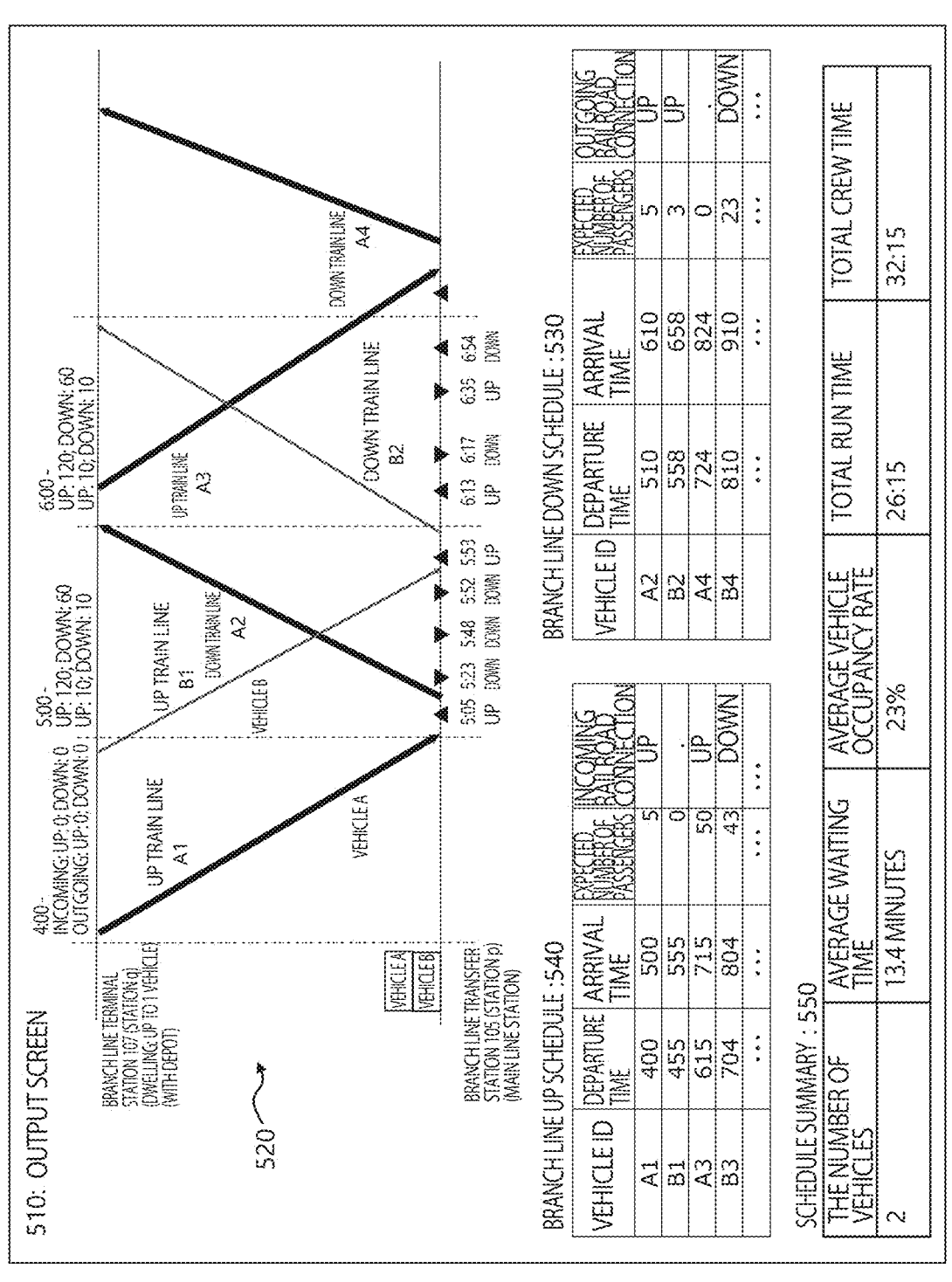
FIG. 22 is a diagram showing an example of an output screen displayed by an output GUI.

FIG. 22 shows an example of an output screen 510 displayed by an output GUI 500. Output data contained in the output screen is based on a main line schedule and number-of-incoming/outgoing-transit-passengers information different from the example of FIG. 20 and the first departure time of a main line, the number of incoming and outgoing passengers, and the like are different from the values shown in FIG. 20.

The output screen in FIG. 22 displays a branch line down schedule 530 and a branch line up schedule 540 in tabular form as output data. Furthermore, the output screen displays a schedule 520, which visually shows contents of the branch line down schedule 530 and branch line up schedule 540 with the ordinate representing stations and the abscissa representing time as well as summary information (schedule summary) 550 about the schedule 520. Note that the schedule 520 is identical to the graph shown earlier in FIG. 2. Besides the branch line down schedule 530 and the branch line up schedule 540 are basically identical to the schedules shown in FIG. 8, but "Expected Number of Passengers" and "Incoming Railroad Connection" columns have been added. There is no need to display all the schedules. For example, by displaying only the branch line down schedule 530 and the branch line up schedule 540 as basic information, the schedule 520 and the schedule summary 550 may be displayed selectively at the direction of the user. Alternatively, only the schedule 520 may be displayed as output data. The schedule summary 550 includes the number of vehicles, the average waiting time, the average vehicle occupancy rate, total run time, and total crew time, but is not limited thereto.

Thus, according to the present embodiment, when the number of vehicles on a branch line as well as a main line schedule are given, an operation schedule of the branch line (second route) can be created by taking efficiency (e.g., minimization of waiting time for passengers) of transfer to/from the main line (first route) into consideration.

Second Embodiment: When a Maximum Value of Waiting Time for Passengers Exists It has been assumed in the first embodiment that there is no limit to the waiting time for passengers (the passengers continue to wait endlessly). Actually, however, if there is a waiting time equal to or longer than a predetermine period (e.g., 60 minutes), the passengers will become increasingly frustrated and may use another means of transportation. Thus, it is considered appropriate to add a constraint to a model using a penalty value as a degree of dissatisfaction. Such a constraint can be implemented by rewriting constraint equations (5) and (7) as shown, for example, in Equations (13) and (14) below, respectively. In the equations, V is an upper limit of waiting time and W is a penalty value. Note that W may be a value larger than M or a value equal to or smaller than M.

$$W \cdot \left(1 - \sum_{k:I_{upprev}(i,V) \le k \le i} x_k \right) \le v_i, \quad \forall\, i \in \mathcal{I}_{up*} \tag{13}$$

$$W \cdot \left(1 - \sum_{k:i \le k \le U_{downnext}(i,V)} y_k \right) \le w_i, \quad \forall\, i \in \mathcal{I}_{down*} \tag{14}$$

In Expression 2 above, $I_{(upprev)}(i,V)$ is a set of those candidate up train lines to which passengers can transfer within V minutes (inclusive) from a main line train directly connected to the candidate up train line i. $I_{(downnext)}(i,V)$ is a set of those candidate down train lines to which passengers can transfer within V minutes (inclusive) from a main line train directly connected to the candidate down train line i. When no candidate up train line is selected from $I_{(upprev)}(i,V)$, $v_i$ becomes equal to or larger than W. When no candidate down train line is selected from $I_{(downnext)}(i,V)$, $w_i$ becomes equal to or larger than W. Note that the value of W may be equal or different between Equations (13) and (14).

Note that processes other than the process described above are similar to those of the first embodiment, and thus description thereof will be omitted. According to the second embodiment, in addition to input information used in the first embodiment, it is necessary to input the upper limit V of waiting time and the penalty value W for violation of the upper limit V.

Thus, according to the present embodiment, branch line schedules can be created by setting a limit to the waiting time for passengers.

Third Embodiment: When Crew Time is Taken into Consideration

Whereas in the first embodiment, only the waiting time for passengers is considered as an evaluation index of branch line schedules, it is sometimes desired to reflect the cost of the operating company as well. Specifically, the cost (crew cost) of the operating company includes crew time of crew members. Most simply, the crew time is the sum total of run times.

The sum of up crew times can be expressed by Equation (15) below.

$$time_U = \sum_{i:i\in I_{up}} (Arv(i) - Dep(i))x_i \tag{15}$$

The sum of down crew times can be expressed by Equation (16) below.

$$time_D = \sum_{i:i\in I_{down}} (Arv(i) - Dep(i))y_i \tag{16}$$

The sum of crew waiting times at the branch line terminal station 107 can be expressed by Equation (17) below.

$$\text{time}_R = \sum_{i:i\in I_{up}} Dep(i)x_i - \sum_{i:i\in I_{down}} Arv(i)y_i \qquad (17)$$

Therefore, if an evaluation function equation (function of Equation (3)) that represents incoming/outgoing passenger waiting time according to the first embodiment is defined as "time," a new evaluation function given by Equation (18) below can be defined using the evaluation function equation "time," Equations (15) and (16) that represent crew time, and Equation (17) that represents crew waiting time at the branch line terminal station 107, where w, $w_U$, $w_D$, and $w_R$ are evaluation weights.

$$w \times \text{time} + w_U \times \text{time}_U + w_D \times \text{time}_D + w_R \times \text{time}_R \qquad (18)$$

Using the evaluation function given by Equation (18), a branch line schedule can be created by taking into consideration both crew time and waiting times for incoming/outgoing passengers and crew members. According to the third embodiment, in addition to input information used in the first embodiment, it is necessary to input evaluation weights w, $w_U$, $w_D$, and $w_R$.

Processes other than the process described above are similar to those of the first embodiment, and thus description thereof will be omitted. Whereas an example of evaluation that takes crew time and waiting time for crew members into consideration has been shown in the present embodiment, evaluation may be made by taking only one of the crew time and waiting time for the crew members into consideration. Alternatively, the evaluation may further take break time and the like of the crew members into consideration. Besides, whereas the crew time has been considered as crew cost, cost such as salaries and the like paid to the crew members may be considered. Cost per unit time may increase with increases in the crew time.

Thus, according to the present embodiment, a branch line schedule can be created by taking into consideration crew cost such as riding time of crew members.

Fourth Embodiment: When the Number of Vehicles is Minimized

Whereas in the first embodiment, the number of vehicles has been given, in the planning stage of a branch line route schedule, there can be cases in which it is desired to optimize the number of vehicles itself. In that case, comprehensive optimization can be performed by finding a solution (optimum value of the objective function) each time the number of possessed vehicles is increased beginning with 1.

Specifically, by increasing the number of possessed vehicles in order up to the maximum possible number (Cmax) of possessed vehicles beginning with 1, the technique according to the first embodiment is performed, to obtain an optimum solution and an evaluation value therefor (an output value of the function of Equation (3)) when the number of possessed vehicles is 1, an optimum solution and an evaluation value therefor when the number of possessed vehicles is 2, and so on. By adding the costs (operating cost, maintenance cost, etc.) of k vehicles to the evaluation value for the number k of possessed vehicles, an overall evaluation value is obtained for each number k of possessed vehicles where the overall evaluation value is the sum of the evaluation value and the cost of k vehicles. The number of vehicles that minimizes the overall evaluation value or makes the overall evaluation value equal to or lower than a threshold is adopted. This makes it possible to optimize the evaluation of waiting time and the number of vehicles, both taken together. According to the fourth embodiment, in addition to input information used in the first embodiment, it is necessary to input the maximum possible number Cmax of possessed vehicles.

The present embodiment makes it possible to simultaneously optimize or quasi-optimize a branch line schedule and the number of vehicles used on the branch line.

Fifth Embodiment: When it is Desired to Aim at Improving an Existing Branch Line Schedule The first embodiment is premised on creating a branch line schedule from scratch. Actually, however, there are cases in which there is an original branch line schedule (an existing operation schedule or an existing schedule) and there can be situations in which it is desired to aim at improving an original schedule. In that case, in creating candidate train lines in Step 1, it is conceivable to input all the train lines existing in the original schedule as part of the candidate train lines to be created. In that case, if the original schedule is most suitable, the original schedule is outputted, but if a solution with a higher evaluation than the original schedule is obtained, the solution is outputted.

If it is desired to use the candidate train lines in the original schedule as they are whenever possible, a technique that will reflect evaluation in an evaluation equation (Equation (3)) may be adopted such that a high evaluation is available when the candidate train lines in the original schedule are adopted. For example, a term of multiplying the number of train lines matching the candidate train lines in the original schedule by a negative coefficient may be added. This will act to lower the value of evaluation equation with increases in the number of matches, increasing the possibility that train lines matching the candidate train lines in the original schedule will be adopted.

According to the fifth embodiment, in addition to input information used in the first embodiment, it is necessary to input the original schedule (an existing branch line schedule).

The present embodiment makes it possible to create a branch line schedule that includes the same branch line train lines as does an existing schedule wherever possible.

Sixth Embodiment: When it is Desired to Create a Branch Line Schedule with Less Delay Whereas in the first embodiment, delays in branch line schedules are not taken into consideration, delays may occur in an actual branch line schedule. To allow passengers to transfer even if a delay occur, it is conceivable to add a margin to the transfer time required to transfer from the branch line up train line to a main line train by taking into consideration a delay distribution (e.g., a delay distribution in each time slot) on a branch line up train line.

For example, if an expected value of a delay time in a certain up train line is 3 minutes, it is conceivable to add 3 minutes as a margin to the original layover of 5 minutes to obtain a new layover of 5+3=8 minutes. It is considered that delays in schedules can occur not only in branch line schedules, but also in main line schedules. If a delay occurs in a main line schedule a layover required to transfer to a branch line down train line can be increased by adding a margin to the layover required to transfer from the main line to the branch line down train line.

According to the sixth embodiment, in addition to input information used in the first embodiment, it is necessary to input a delay distribution on the branch line and/or a delay distribution on the main line.

According to the present embodiment, since a branch line schedule is created using a delay distribution on a branch line schedule or a main line schedule, reflecting branch line delays or main line delays in the branch line schedule in advance, delays in the created branch line schedule can be reduced.

Seventh Embodiment: When there are a Plurality of Depots, when a Depot and a Station do not Match, or when there are a Plurality of Transfer Stations The first embodiment has been discussed using a simple example in which there is one depot (branch line depot 108), the depot and a station match (the branch line depot 108 matches the branch line transfer station 105), and there is one transfer station (branch line transfer station 105).

In contrast, when there are a plurality of depots on the branch line 102, the constraint conditions given by equations (8) and (9) can be considered for each depot. This makes it possible to create a branch line schedule whereby as many vehicles as the number of vehicles possessed by each depot are placed at the depot at the end of the day's operation.

When a depot and a station do not match, the time required can be calculated by adding the travel time from the depot to the station when the vehicle is taken out of the depot on the day in question. As an example, the departure time (first departure time) of a train line starting from a destination station of the vehicle taken out of the depot may be advanced from the departure time that would occur when the depot and the station matched, by the travel time. As another method, by treating the depot the same as a station, a train line moving from the depot to the station may be added to the schedule.

When there are a plurality of transfer stations, the process used when there is one transfer station can easily be expanded by considering the constraint conditions on waiting time at each of the transfer stations, where the constraint conditions have been discussed in relation to equations (4) to (7), and by defining the sum total of the waiting times at all the transfer stations in the objective function (evaluation function) of Equation (3).

According to the seventh embodiment, it is sufficient to input information about a plurality of depots and a plurality of transfer stations following the notation of the branch line route information 200 used in input according to the first embodiment.

The present embodiment makes it possible to create an efficient branch line schedule regardless of the number of branch line depots, the locations of the depots, and the number of branch line transfer stations.

Eighth Embodiment: Vehicle Control Using a Branch Line Schedule

Vehicle control may actually be performed on the branch line 102 using a branch line schedule created in any of the first to seventh embodiments with vehicles assigned thereto.

Figure 23:
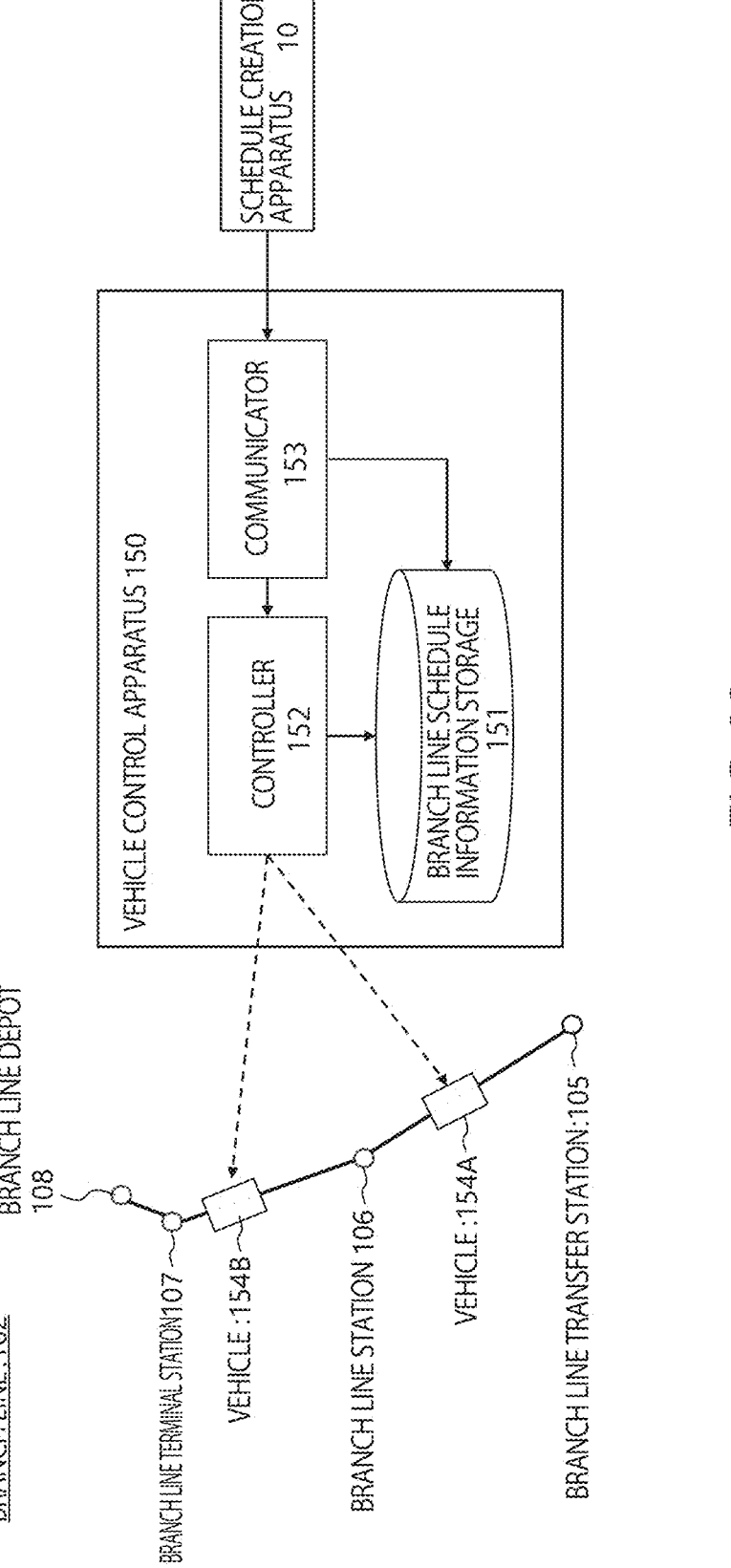
FIG. 23 is a block diagram showing an example of a vehicle operation system.

FIG. 23 is a block diagram showing an example of a vehicle operation system according to the eighth embodiment. The vehicle operation system includes the schedule creation apparatus 10 and a vehicle control apparatus 150.

The schedule creation apparatus 10 and the vehicle control apparatus 150 can communicate with each other via a communications network. The schedule creation apparatus 10 transmits information about a created branch line schedule (to which vehicles have been assigned) to the vehicle control apparatus 150. A communicator 153 of the vehicle control apparatus 150 receives information about the branch line schedule and stores the information in a branch line schedule information storage 151. A controller 152 (controlling circuitry) of the vehicle control apparatus 150 performs operation control of vehicles 154A and 154B on the branch line 102 according to the information. If the information about the branch line schedule generated by the schedule creation apparatus 10 is in such format that cannot be interpreted directly by the controller 152, the information may be converted into format interpretable by the controller 152 and the controller 152 may perform operation control based on the information resulting from the conversion. The vehicles 154A and 154B may be either unmanned or manned. As an example, the vehicle control apparatus 150 may perform fully automatic operation of the vehicles 154A and 154B. For example, if the vehicles 154A and 154B are trains, then a railroad with fully automatic operation is implemented on the branch line 102. An information processing apparatus may be constructed by incorporating the controller 152 and branch line schedule information storage 151 of the vehicle control apparatus 150 into the schedule creation apparatus 10.

(Hardware Configuration)

A hardware configuration of the schedule creation apparatus according to the above embodiments will be described with reference to FIG. 24.

Figure 24:
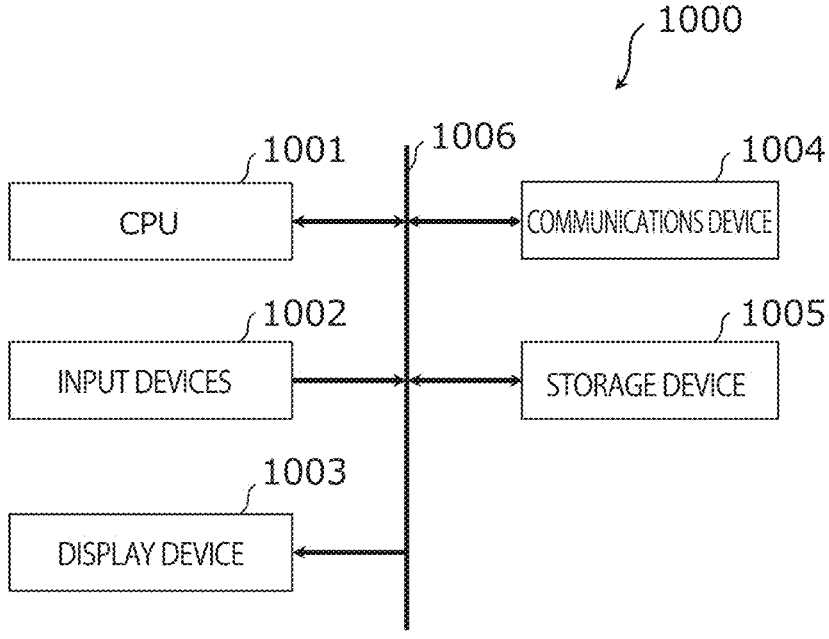
FIG. 24 is a diagram showing a hardware configuration of the schedule creation apparatus, which is an information processing apparatus according to embodiments.

FIG. 24 shows a hardware configuration of the schedule creation apparatus, which is an information processing apparatus according to the embodiments. As shown in FIG. 24, the schedule creation apparatus according to the embodiments of the present invention is made up of a computer 1000. The computer 1000 includes a CPU 1001 (central processing unit), input devices 1002, a display device 1003, a communications device 1004, and a storage device 1005, which are interconnected via a bus 1006.

The CPU 1001 is a control unit and arithmetic unit of the computer 1000. The CPU 1001 performs computational processes based on data and programs received as input from various devices (e.g., the input devices 1002, the communications device 1004, and the storage device 1005) connected via the bus 1006 and outputs computational results and control signals to various devices (e.g., the display device 1003, the communications device 1004, and the storage device 1005) connected via the bus 1006.

Specifically, the CPU 1001 executes an OS (operating system) of the computer 1000, a branch line schedule creation program (information processing program), and the like and controls various devices making up the computer 1000. The branch line schedule creation program makes the computer 1000 implement the above-mentioned functional components of the schedule creation apparatus. As the CPU 1001 executes the branch line schedule creation program, the computer 1000 functions as the schedule creation apparatus. The input devices 1002 are used to enter information to the computer 1000. The input devices 1002 are, for example, a keyboard, a mouse, and/or a touch panel, but are not limited thereto. The input devices 1002 allow the user to enter input information.

The display device 1003 is used to display images and videos. The display device 1003 is, for example, an LCD (liquid crystal display), a CRT (cathode ray tube), or a PDP (plasma display panel), but is not limited thereto. The user can display optimization results on the display device 1003.

The communications device 1004 allows the computer 1000 to communicate with an external device by radio or by wire. The communications device 1004 includes a modem, a hub, and a router, but is not limited thereto. The input information may be sent from the external device via the communications device 1004.

The storage device 1005 is a storage medium configured to store the OS of the computer 1000, the branch line schedule creation program, data necessary for execution of the branch line schedule creation program, and data generated by the execution of the branch line schedule creation program. The storage device 1005 includes a main storage device and external storage devices. The main storage device is, for example, RAM, DRAM, or SRAM, but is not limited thereto. The external storage devices are a hard disk, an optical disk, a flash memory, and a magnetic tape, but are not limited thereto. Note that the computer 1000 may include one or more of the CPU 1001, the input devices 1002, the display device 1003, the communications device 1004, and the storage device 1005, and may be connected with a peripheral such as a printer or a scanner. The schedule creation apparatus may be made up of the single computer 1000 or may be configured as a system made up of a plurality of the computers 1000 connected with one another. Furthermore, the branch line schedule creation program may be prestored in the storage device 1005 of the computer 1000, stored in a storage medium such as a CD-ROM, or uploaded to the Internet. In any case, when executed by being installed on the computer 1000, the branch line schedule creation program can make up the schedule creation apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

CLAUSES

Clause 1. An information processing apparatus comprising a processing circuitry configured to acquire, with respect to a first route including a plurality of first stop positions in which one of the first stop positions is a first transfer position, one or more pieces of first train line information each including at least one of a stop time and a departure time at the first stop positions of at least one first moving vehicle;

acquire route information of a second route that includes a plurality of second stop positions, one of the second stop positions being a second transfer position that allows a transfer to or from the first transfer position;

acquire number-of-passengers information on a number of passengers who transfer from the first transfer position to the second transfer position or from the second transfer position to the first transfer position; and create one or more pieces of second train line information including a stop time and a departure time at the second stop positions of at least one of second moving vehicle, based on the one or more pieces of first train line information, the route information and the number-of-passengers information.

Clause 2. The information processing apparatus according to clause 1, wherein:

the number-of-passengers information includes the number of transferring passengers classified by time slot or by the first train line information; and the processing circuitry creates a plurality of candidate train lines, which are candidates for the second train line information, optimizes or quasi-optimizes an evaluation index regarding a total amount of waiting time for passengers at the second transfer position or the first transfer position in case of a transfer from the first transfer position to the second transfer position or from the second transfer position to the first transfer position based on a constraint condition on the number of second moving vehicles available for use on the second route, and selects the one or more pieces of second train line information from the plurality of candidate train lines based on the optimized or quasi-optimized evaluation index.

Clause 3. The information processing apparatus according to clause 2, wherein: the processing circuitry sets a coefficient that represents the number of passengers transferring from the first transfer position to the second transfer position or from the second transfer position to the first transfer position in case that the each of candidate train lines is selected and sets a first variable that represents the waiting time for a transfer from the first transfer position to the second transfer position or from the second transfer position to the first transfer position in case that each of the candidate train lines is selected;

generates a function of an evaluation index regarding the total waiting time for the passengers using the coefficient and the first variable which are set for each of the candidate train lines; and calculates values of the plurality of second variables by optimizing or quasi-optimizing the function under a first constraint condition of the waiting time for the passengers, the first constrain condition including a plurality of second variables that represent a binary regarding whether to select the plurality of candidate train lines, and selects the one or more pieces of second train line information from the candidate train lines based on the values of the plurality of second variables.

Clause 4. The information processing apparatus according to clause 2 or 3, wherein the processing circuitry optimizes or quasi-optimizes the evaluation index regarding the total waiting time for the passengers under a second constraint condition regarding a turnaround time that has to be left between a time when the second moving vehicle operated based on certain second train line information arrives at the second transfer position and a time when the second moving vehicle leaves the second transfer position based on other second train line information, and selects the one or more pieces of second train line information from the plurality of candidate train lines based on the optimized or quasi-optimized evaluation index.

Clause 5. The information processing apparatus according to clause 4, wherein the processing circuitry selects the one or more pieces of second train line information from the plurality of candidate train lines based on a constraint condition regarding the number of second moving vehicles able to dwell simultaneously at the second transfer position.

Clause 6. The information processing apparatus according to clause 2 or 3, wherein the processing circuitry optimizes or quasi-optimizes an evaluation index regarding a sum total of a total amount of crew cost for crew members boarding the second moving vehicle and the total amount of waiting time based on the information of crew members on the second route, and selects the one or more pieces of second train line information from the plurality of candidate train lines based on the optimized or quasi-optimized evaluation index.

Clause 7. The information processing apparatus according to clause 6, wherein the crew cost is crew time.

Clause 8. The information processing apparatus according to clause 2 or 3, wherein the processing circuitry sets a plurality of candidates for an upper limit to the number of second moving vehicles able to be used on the second route, optimizes or quasi-optimizes the evaluation index for each of the plurality of candidates for the upper limit, and determines one of the candidates for the upper limit as an upper limit to the number of second moving vehicles able to be used on the second route, based on the optimized or quasi-optimized evaluation index.

Clause 9. The information processing apparatus according to clause 2 or 3, wherein the processing circuitry uses a plurality of pieces of train line information making up an existing operation schedule of the second route as part of the plurality of candidate train lines.

Clause 10. The information processing apparatus according to clause 2 or 3, wherein the evaluation index is optimized or quasi-optimized under a constraint condition that the waiting time is equal to or longer than a layover required for passengers to transfer from the first transfer position to the second transfer position or from the second transfer position to the first transfer position, and is left between a stop time or a departure time at the second transfer position according to the second train line information and a stop time or a departure time at the first transfer position according to the first train line information.

Clause 11. The information processing apparatus according to clause 10, wherein the processing circuitry optimizes or quasi-optimizes the evaluation index under a constraint condition that at least one of the first moving vehicle or the second moving vehicle delays according to a delay time distribution on the first route or a delay time distribution on the second route.

Clause 12. The information processing apparatus according to clause 11, wherein the processing circuitry adds a margin time according to at least one of the delay time distribution on the first route or the delay time distribution on the second route to the layover and optimizes or quasi-optimizes the evaluation index under a constraint condition that a time equal to or longer than a result of the addition is left between the stop time or the departure time at the second transfer position according to the second train line information and the stop time or the departure time at the first transfer position according to the first train line information.

Clause 13. The information processing apparatus according to any one of clauses 1 to 3, wherein the one or more pieces of second train line information includes train line information for moving in a first direction on the second route and train line information for moving in a second direction opposite the first direction.

Clause 14. The information processing apparatus according to clause 13, wherein the train line information for moving in the first direction on the second route includes train line information for which the second transfer position is a terminus, and the train line information for moving in the second direction opposite the first direction includes train line information for which the second transfer position is a start point.

Clause 15. The information processing apparatus according to clause 13, wherein the one or more pieces of first train line information includes train line information for moving in a third direction on the first route and train line information for moving in a fourth direction opposite the third direction.

Clause 16. The information processing apparatus according to any one of clauses 1 to 3, wherein the first route is a train route and the second route is a bus route.

Clause 17. The information processing apparatus according to any one of clauses 1 to 3, wherein based on information of a plurality of second moving vehicles, the processing circuitry assigns one of the second moving vehicles to each of the one of more pieces of second train line information.

Clause 18. The information processing apparatus according to clause 17, further comprising a controlling circuitry configured to control operation of the second moving vehicles on the second route based on the second train line information assigned to the second moving vehicles.

Clause 19. An information processing method comprising:

acquiring, with respect to a first route including a plurality of first stop positions in which one of the first stop positions is a first transfer position, one or more pieces of first train line information each including at least one of a stop time and a departure time at the first stop positions of at least one first moving vehicle, acquiring route information of a second route that includes a plurality of second stop positions, one of the second stop positions being a second transfer position that allows a transfer to or from the first transfer position;

acquiring number-of-passengers information on a number of passengers who transfer from the first transfer position to the second transfer position or from the second transfer position to the first transfer position; and creating one or more pieces of second train line information including a stop time and a departure time at the second stop positions of at least one of second moving vehicle, based on the one or more pieces of first train line information, the route information and the number-of-passengers information.

Clause 20. A non-transitory computer readable medium having a computer program stored therein which causes a computer to perform processes comprising:

acquiring, with respect to a first route including a plurality of first stop positions in which one of the first stop positions is a first transfer position, one or more pieces of first train line information each including at least one of a stop time and a departure time at the first stop positions of at least one first moving vehicle, acquiring route information of a second route that includes a plurality of second stop positions, one of the second stop positions being a second transfer position that allows a transfer to or from the first transfer position;

acquiring number-of-passengers information on a number of passengers who transfer from the first transfer position to the second transfer position or from the second transfer position to the first transfer position; and creating one or more pieces of second train line information including a stop time and a departure time at the second stop positions of at least one of second moving vehicle, based on the one or more pieces of first train line information, the route information and the number-of-passengers information.

The invention claimed is:

1. An information processing apparatus comprising a processing circuitry configured to acquire, with respect to a first route including a plurality of first stop positions in which one of the first stop positions is a first transfer position, one or more pieces of first train line information each including at least one of a stop time and a departure time at the first stop positions of at least one first moving vehicle;

acquire route information of a second route that includes a plurality of second stop positions, one of the second stop positions being a second transfer position that allows a transfer to or from the first transfer position;

acquire number-of-passengers information on a number of passengers who transfer from the first transfer position to the second transfer position or from the second transfer position to the first transfer position, the number-of-passengers information being classified by at least one of time slot or the first train line information;

create, based on the one or more pieces of first train line information, the route information and the number-of-passengers information, a plurality of candidate train lines each including a stop time and a departure time at the second stop positions of at least one of second moving vehicles;

optimize or quasi-optimize an evaluation index regarding a total amount of waiting time for passengers in case of a transfer between the first and second transfer positions under a constraint condition on a number of the second moving vehicles available for use on the second route; and select one or more pieces of second train line information from among the plurality of candidate train lines based on the optimized or quasi-optimized evaluation index.

2. The information processing apparatus according to claim 1, wherein:

the transfer between the first and second transfer positions includes at least one of a transfer from the first transfer position to the second transfer position or from the second transfer position to the first transfer position.

3. The information processing apparatus according to claim 2, wherein: the processing circuitry sets, for each of the plurality of candidate train lines, a coefficient that represents the number of passengers transferring from the first transfer position to the second transfer position or from the second transfer position to the first transfer position in case that each of the candidate train lines is selected, and sets a first variable that represents a waiting time for a transfer from the first transfer position to the second transfer position or from the second transfer position to the first transfer position in case that each of the candidate train lines is selected;

generates a function of the evaluation index regarding a total amount of waiting time for the passengers using the coefficient and the first variable which are set for each of the candidate train lines; and calculates values of a plurality of second variables by optimizing or quasi-optimizing the function under a first constraint condition including a plurality of second variables that represent whether to select each of the plurality of candidate train lines, the second variables being a binary, and selects the one or more pieces of second train line information from among the plurality of candidate train lines based on the values of the plurality of second variables.

4. The information processing apparatus according to claim 2, wherein the processing circuitry optimizes or quasi-optimizes the evaluation index regarding the total amount of waiting time for the passengers under a second constraint condition regarding a turnaround time to be left-secured between an arrival of a second moving vehicle at the second transfer position according to one of the candidate train lines and a departure of the second moving vehicle from the second transfer position according to another of the candidate train lines, and selects the one or more pieces of second train line information from the plurality of candidate train lines based on the optimized or quasi-optimized evaluation index.

5. The information processing apparatus according to claim 4, wherein the processing circuitry optimizes or quasi-optimizes the evaluation index regarding the total amount of waiting time for the passengers under a constraint condition regarding a number of second moving vehicles able to dwell simultaneously at the second transfer position, and selects one or more pieces of second train line information from among the plurality of candidate train lines based on the optimized or quasi-optimized evaluation index.

6. The information processing apparatus according to claim 1, wherein the processing circuitry optimizes or quasi-optimizes an evaluation index regarding a sum total of a total amount of crew cost for crew members boarding the second moving vehicle and the total amount of waiting time based on the information of crew members on the second route, and selects the one or more pieces of second train line information from the plurality of candidate train lines based on the optimized or quasi-optimized evaluation index.

7. The information processing apparatus according to claim 6, wherein the crew cost is crew time.

8. The information processing apparatus according to claim 1, wherein the processing circuitry sets a plurality of candidates for an upper limit on a number of second moving vehicles usable on the second route, optimizes or quasi-optimizes the evaluation index for each of the plurality of upper-limit candidates, and determines one of the upper-limit candidates as the upper limit on the number of second moving vehicles usable on the second route, based on the optimized or quasi-optimized evaluation index.

9. The information processing apparatus according to claim 1, wherein the processing circuitry uses a plurality of pieces of train line information included in an existing operation schedule of the second route as part of the plurality of candidate train lines.

10. The information processing apparatus according to claim 2, wherein the evaluation index is optimized or quasi-optimized under a constraint condition that the waiting time is equal to or longer than a layover required for passengers to transfer from the first transfer position to the second transfer position or from the second transfer position to the first transfer position, and the layover is defined as an interval between a stop time or a departure time at the second transfer position according to the second train line information and a stop time or a departure time at the first transfer position according to the first train line information.

11. The information processing apparatus according to claim 10, wherein the processing circuitry optimizes or quasi-optimizes the evaluation index under a constraint condition that at least one of the first moving vehicle or the second moving vehicle is delayed according to a delay time distribution on the first route or a delay time distribution on the second route.

12. The information processing apparatus according to claim 11, wherein the processing circuitry:

adds a margin time according to at least one of the delay time distribution on the first route or the delay time distribution on the second route to the layover; and optimizes or quasi-optimizes the evaluation index under a constraint condition that a time equal to or longer than a result of the addition is left as an interval between the stop time or the departure time at the second transfer position according to the second train line information and the stop time or the departure time at the first transfer position according to the first train line information.

13. The information processing apparatus according to claim 1, wherein the one or more pieces of second train line information includes train line information for moving in a first direction on the second route and train line information for moving in a second direction opposite the first direction.

14. The information processing apparatus according to claim 13, wherein the train line information for moving in the first direction on the second route includes train line information for which the second transfer position is a terminus, and the train line information for moving in the second direction opposite the first direction includes train line information for which the second transfer position is a start point.

15. The information processing apparatus according to claim 13, wherein the one or more pieces of first train line information includes train line information for moving in a third direction on the first route and train line information for moving in a fourth direction opposite the third direction.

16. The information processing apparatus according to claim 1, wherein the first route is a train route and the second route is a bus route.

17. The information processing apparatus according to claim 1, wherein based on information of a plurality of second moving vehicles, the processing circuitry assigns one of the second moving vehicles to each of the one or more pieces of second train line information.

18. The information processing apparatus according to claim 17, further comprising a controlling circuitry configured to control operation of the second moving vehicles on the second route based on the second train line information assigned to the second moving vehicles.

19. An information processing method comprising:

acquiring, with respect to a first route including a plurality of first stop positions in which one of the first stop positions is a first transfer position, one or more pieces of first train line information each including at least one of a stop time and a departure time at the first stop positions of at least one first moving vehicle, acquiring route information of a second route that includes a plurality of second stop positions, one of the second stop positions being a second transfer position that allows a transfer to or from the first transfer position;

acquiring number-of-passengers information on a number of passengers who transfer from the first transfer position to the second transfer position or from the second transfer position to the first transfer position, the number-of-passengers information being classified by at least one of time slot or the first train line information;

creating, based on the one or more pieces of first train line information, the route information and the number-of-passengers information, a plurality of candidate train lines each including a stop time and a departure time at the second stop positions of at least one of second moving vehicles;

optimizing or quasi-optimizing an evaluation index regarding a total amount of waiting time for passengers in case of a transfer between the first and second transfer positions under a constraint condition on a number of the second moving vehicles available for use on the second route; and selecting one or more pieces of second train line information from among the plurality of candidate train lines based on the optimized or quasi-optimized evaluation index.

20. A non-transitory computer readable medium having a computer program stored therein which causes a computer to perform processes comprising:

acquiring, with respect to a first route including a plurality of first stop positions in which one of the first stop positions is a first transfer position, one or more pieces of first train line information each including at least one of a stop time and a departure time at the first stop positions of at least one first moving vehicle, acquiring route information of a second route that includes a plurality of second stop positions, one of the second stop positions being a second transfer position that allows a transfer to or from the first transfer position;

acquiring number-of-passengers information on a number of passengers who transfer from the first transfer position to the second transfer position or from the second transfer position to the first transfer position, the number-of-passengers information being classified by at least one of time slot or the first train line information;

creating, based on the one or more pieces of first train line information, the route information and the number-of-passengers information, a plurality of candidate train lines each including a stop time and a departure time at the second stop positions of at least one of second moving vehicles;

optimizing or quasi-optimizing an evaluation index regarding a total amount of waiting time for passengers in case of a transfer between the first and second transfer positions under a constraint condition on a number of the second moving vehicles available for use on the second route; and selecting one or more pieces of second train line information from among the plurality of candidate train lines based on the optimized or quasi-optimized evaluation index.

* * * * *

38